United States Patent [19]
Lichti

[11] Patent Number: 5,588,790
[45] Date of Patent: Dec. 31, 1996

[54] HIGH SPEED STORAGE SYSTEM

[76] Inventor: Robert D. Lichti, P.O. Box 1489, Chester, Calif. 96020

[21] Appl. No.: 151,971

[22] Filed: Nov. 1, 1993

[51] Int. Cl.[6] .................................................. B65G 1/10
[52] U.S. Cl. ...................... 414/331; 198/333; 198/347.2; 198/468.6; 211/1.55; 364/478.01; 414/281
[58] Field of Search ........................... 364/478; 211/1.5; 198/347.2, 468.6, 833; 414/331, 286, 222, 281, 223, 282

[56] References Cited

U.S. PATENT DOCUMENTS

| | | |
|---|---|---|
| 844,806 | 2/1907 | Jones . |
| 931,570 | 8/1909 | Courtney . |
| 1,020,746 | 3/1912 | Dehler . |
| 1,046,386 | 12/1912 | Heimer . |
| 1,135,316 | 4/1915 | Olson . |
| 1,525,870 | 2/1925 | Lee . |
| 1,669,497 | 5/1928 | Steegmuller . |
| 1,718,512 | 6/1929 | Wright et al. . |
| 2,226,742 | 12/1940 | Raymond ................................. 154/9 |
| 2,353,638 | 7/1944 | Beaulieu et al. . |
| 2,605,912 | 8/1952 | Small et al. . |
| 2,707,548 | 5/1955 | Furst . |
| 2,734,617 | 2/1956 | Temple . |
| 2,736,419 | 2/1956 | Ferro . |
| 3,062,358 | 11/1962 | Woodward . |
| 3,068,987 | 12/1962 | Franklin . |
| 3,148,785 | 9/1964 | Fauconnier . |
| 3,184,032 | 5/1965 | Jonsson . |
| 3,244,304 | 4/1966 | Pollak, Jr. et al. . |
| 3,268,055 | 8/1966 | Stein et al. . |
| 3,278,052 | 10/1966 | Lichti . |
| 3,368,688 | 2/1968 | Weiss et al. .......................... 211/1.5 |
| 3,379,321 | 4/1968 | Weir ..................................... 214/16.4 |
| 3,391,474 | 7/1968 | Hays, Jr. ................................. 35/13 |
| 3,402,835 | 9/1968 | Saul ....................................... 214/16.4 |
| 3,402,836 | 9/1968 | Debrey et al. ....................... 214/16.4 |
| 3,415,353 | 12/1968 | Oertle, Jr. ............................... 198/156 |
| 3,424,321 | 1/1969 | Lichti ..................................... 214/16.1 |

(List continued on next page.)

FOREIGN PATENT DOCUMENTS

| | | |
|---|---|---|
| 0140393 | 6/1981 | European Pat. Off. . |
| 0272340 | 6/1988 | European Pat. Off. . |
| 1427294 | 10/1965 | France . |
| 1427294 | 4/1966 | France . |
| 2587005 | 11/1987 | France . |
| 630499 | 5/1936 | Germany ............................... 198/833 |
| 2515829 | 10/1976 | Germany . |
| 3218253 | 12/1982 | Germany . |
| 3442161 | 5/1986 | Germany ............................... 414/331 |
| 3514932 | 10/1986 | Germany . |
| 54-131278 | 10/1979 | Japan . |
| 59-48306 | 3/1984 | Japan ..................................... 414/331 |
| 59-48308 | 3/1984 | Japan ..................................... 414/331 |
| 0212304 | 12/1984 | Japan ..................................... 414/331 |
| 59-212304 | 12/1984 | Japan ..................................... 441/331 |
| 60-52405 | 3/1985 | Japan . |
| 60-93007 | 5/1985 | Japan ..................................... 414/331 |
| 61-27804 | 2/1986 | Japan ..................................... 414/285 |
| 61-55004 | 3/1986 | Japan ..................................... 414/331 |
| 61-81302 | 4/1986 | Japan ..................................... 441/331 |
| 61-128104 | 6/1986 | Japan . |
| 61-131845 | 6/1986 | Japan ..................................... 414/331 |
| 61-229703 | 10/1986 | Japan . |
| 61-243701 | 10/1986 | Japan . |
| 62-16904 | 1/1987 | Japan . |
| 62-74811 | 4/1987 | Japan ..................................... 441/331 |
| 62-215410 | 9/1987 | Japan ..................................... 414/331 |
| 424919 | 2/1926 | Netherlands . |
| 449198 | 4/1986 | Switzerland . |
| 2157667 | 10/1985 | United Kingdom . |

Primary Examiner—Frank E. Werner

[57] ABSTRACT

A storage system including a container storage area in the form of a multi-rack, multi-tier storage carousel, a vertical conveyor for transporting conveyors vertically and input and output shuttle units for conveying containers between the vertical conveyor and the storage carousel. The vertical conveyor includes a loading zone which is below the operating levels of the shuttle units. The storage carousel and the shuttle units are driven by a common mechanically synchronized drive. The vertical conveyor is driven intermittently and independently of the drive for the rest of the system.

30 Claims, 26 Drawing Sheets

U.S. PATENT DOCUMENTS

| | | | |
|---|---|---|---|
| 3,448,870 | 6/1969 | Gallo et al. | 214/16 |
| 3,509,688 | 5/1970 | Hartbauer et al. | 53/163 |
| 3,532,201 | 10/1970 | McConnell | 193/35 |
| 3,534,850 | 10/1970 | Rogers et al. | 198/233 |
| 3,547,281 | 12/1970 | Lichti | 214/16.1 |
| 3,554,391 | 1/1971 | Goodell . | |
| 3,571,892 | 3/1971 | Levy | 29/208 |
| 3,581,865 | 6/1971 | Adams . | |
| 3,593,862 | 7/1971 | Pierson . | |
| 3,627,110 | 12/1971 | Lichti . | |
| 3,633,726 | 1/1972 | Carlier . | |
| 3,642,158 | 2/1972 | Koennecke et al. . | |
| 3,656,608 | 4/1972 | Lichti . | |
| 3,661,284 | 5/1972 | Traube . | |
| 3,670,867 | 6/1972 | Traube . | |
| 3,672,485 | 6/1972 | Walters . | |
| 3,695,462 | 10/1972 | Sullivan . | |
| 3,719,288 | 3/1973 | Schmitt et al. . | |
| 3,726,383 | 4/1973 | Bornfleth . | |
| 3,750,804 | 8/1973 | Lemelson . | |
| 3,780,852 | 12/1973 | Weiss . | |
| 3,785,474 | 1/1974 | Nakamoto . | |
| 3,792,757 | 2/1974 | Musser | 186/1 AC |
| 3,792,785 | 2/1974 | Weir . | |
| 3,803,556 | 4/1974 | Duffy | 340/172.5 |
| 3,805,974 | 4/1974 | Andersson . | |
| 3,809,263 | 5/1974 | Dodd . | |
| 3,883,203 | 5/1975 | Lexe | 312/268 |
| 3,889,797 | 6/1975 | Naito . | |
| 3,902,427 | 9/1975 | Kastenbein | 104/88 |
| 3,903,810 | 9/1975 | Jones | 104/166 |
| 3,928,114 | 12/1975 | Aylon | 156/351 |
| 3,954,165 | 5/1976 | Snyder . | |
| 3,958,102 | 5/1976 | Burt | 235/61.6 R |
| 3,989,090 | 11/1976 | Kawai | 164/228 |
| 4,013,186 | 3/1977 | Barton . | |
| 4,018,325 | 4/1977 | Rejsa | 198/347 |
| 4,023,687 | 5/1977 | Salloum . | |
| 4,033,450 | 7/1977 | Paddock | 198/648 |
| 4,039,785 | 8/1977 | Ziemann | 235/151 |
| 4,071,150 | 1/1978 | Thompson . | |
| 4,088,237 | 5/1978 | Brown . | |
| 4,110,214 | 8/1978 | Peeffer | 210/77 |
| 4,168,009 | 9/1979 | Ide | 414/140 |
| 4,189,273 | 2/1980 | Soderstrom | 414/285 |
| 4,192,496 | 3/1980 | Baselice | 271/10 |
| 4,227,607 | 10/1980 | Malavenda | 198/460 |
| 4,232,779 | 11/1980 | Khoylian | 198/472 |
| 4,239,436 | 12/1980 | Wildenaur | 414/276 |
| 4,244,672 | 1/1981 | Lund | 414/134 |
| 4,307,988 | 12/1981 | Page | 414/276 |
| 4,379,602 | 4/1983 | Iemura | 312/268 |
| 4,379,671 | 4/1983 | Cochran | 414/331 |
| 4,389,157 | 6/1983 | Bernard, II | 414/787 |
| 4,394,104 | 7/1983 | Camerini | 414/276 |
| 4,422,554 | 12/1983 | Lichti | 211/1.5 |
| 4,484,289 | 11/1984 | Hemond | 364/478 |
| 4,492,504 | 1/1985 | Hainsworth | 414/273 |
| 4,505,375 | 3/1985 | Kuster | 198/482 |
| 4,509,893 | 4/1985 | Nashimoto | 414/280 |
| 4,542,808 | 9/1985 | Lloyd et al. | 186/56 |
| 4,543,495 | 9/1985 | Owen | 307/257 |
| 4,547,343 | 10/1985 | Takano et al. | 422/304 |
| 4,561,060 | 12/1985 | Hemond | 364/478 |
| 4,561,820 | 12/1985 | Matheny et al. | 414/331 |
| 4,566,595 | 1/1986 | Fustier | 209/545 |
| 4,574,962 | 3/1986 | Tabler et al. | 211/122 |
| 4,618,932 | 10/1986 | Sauer | 364/478 |
| 4,629,059 | 12/1986 | Allinquant | 198/463.3 |
| 4,643,495 | 2/1987 | Pepping | 312/268 |
| 4,651,863 | 3/1987 | Reuter et al. | 198/339.1 |
| 4,669,047 | 5/1987 | Chucta | 364/468 |
| 4,678,390 | 7/1987 | Bonneton et al. | 414/282 |
| 4,692,876 | 9/1987 | Tenma et al. | 364/513 |
| 4,712,964 | 12/1987 | van Elten | 414/281 |
| 4,722,653 | 2/1988 | Williams | 414/222 |
| 4,787,803 | 11/1988 | van Elten | 414/281 |
| 4,801,236 | 1/1989 | Katzenschwanz | 414/416 |
| 4,812,985 | 3/1989 | Hambrick et al. | 364/478 |
| 4,846,619 | 7/1989 | Crabtree | 414/273 |
| 4,909,697 | 3/1990 | Bernard et al. | 414/331 |
| 4,968,207 | 11/1990 | Lichti | 414/331 |
| 4,983,091 | 1/1991 | Lichti et al. | 414/331 |
| 5,090,863 | 2/1992 | Lichti et al. | 414/331 |
| 5,096,366 | 3/1992 | Bernard et al. | 414/786 |
| 5,161,929 | 11/1992 | Lichti et al. | 414/331 |
| 5,171,120 | 12/1992 | Bernard et al. | 414/331 |
| 5,197,844 | 3/1993 | Lichti et al. | 414/331 |
| 5,209,626 | 5/1993 | Lichti et al. | 414/331 |
| 5,222,855 | 6/1993 | Bernard et al. | 414/331 |
| 5,238,351 | 8/1993 | Lichti et al. | 414/331 |
| 5,246,332 | 9/1993 | Bernard et al. | 414/786 |
| 5,273,392 | 12/1993 | Bernard et al. | 414/786 |

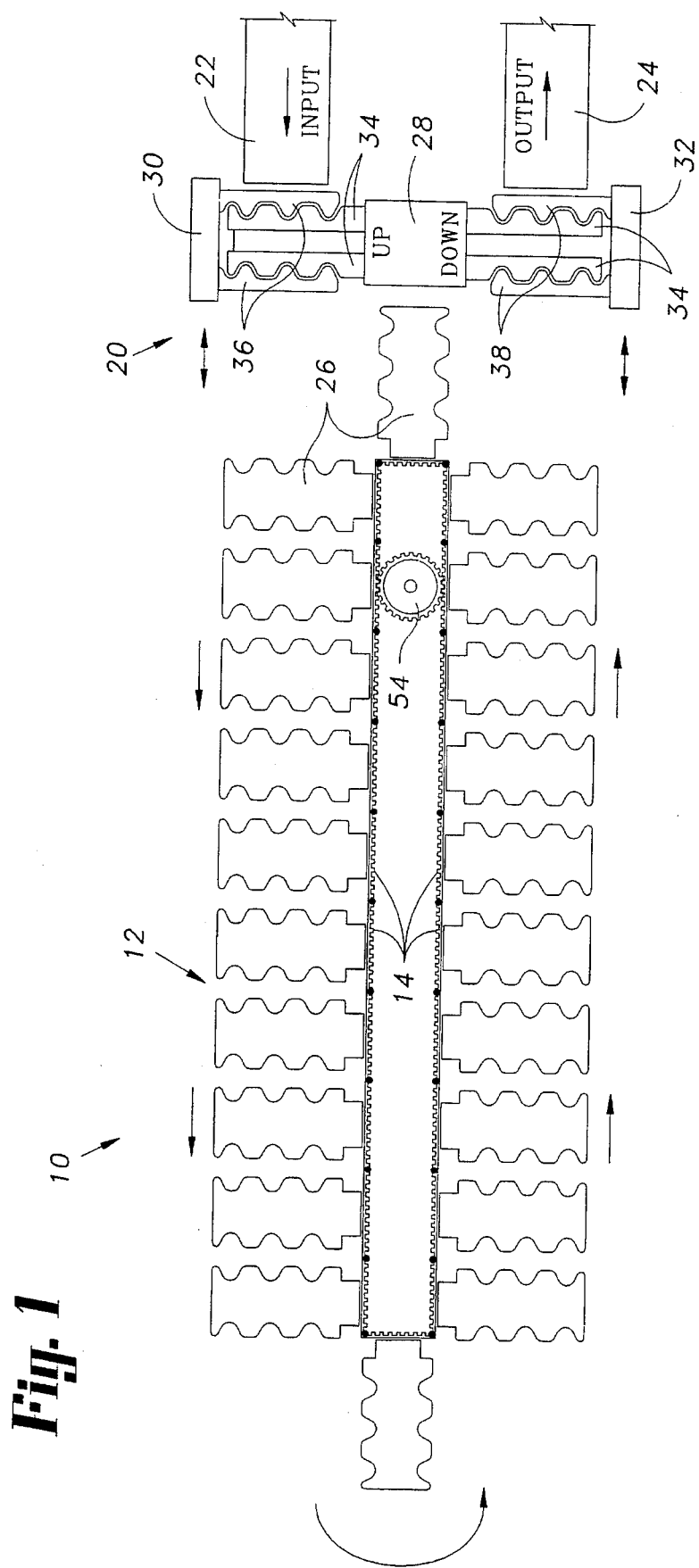

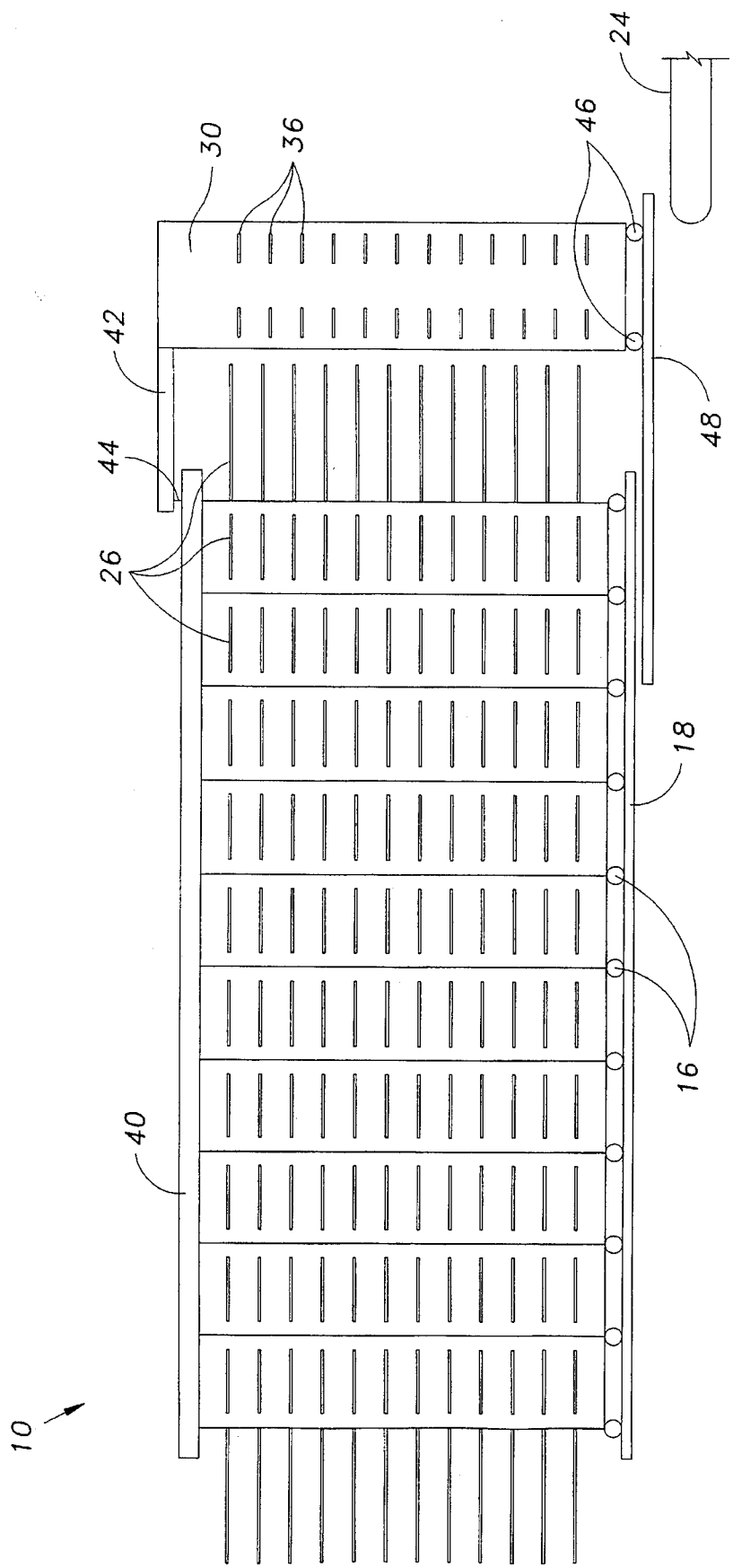

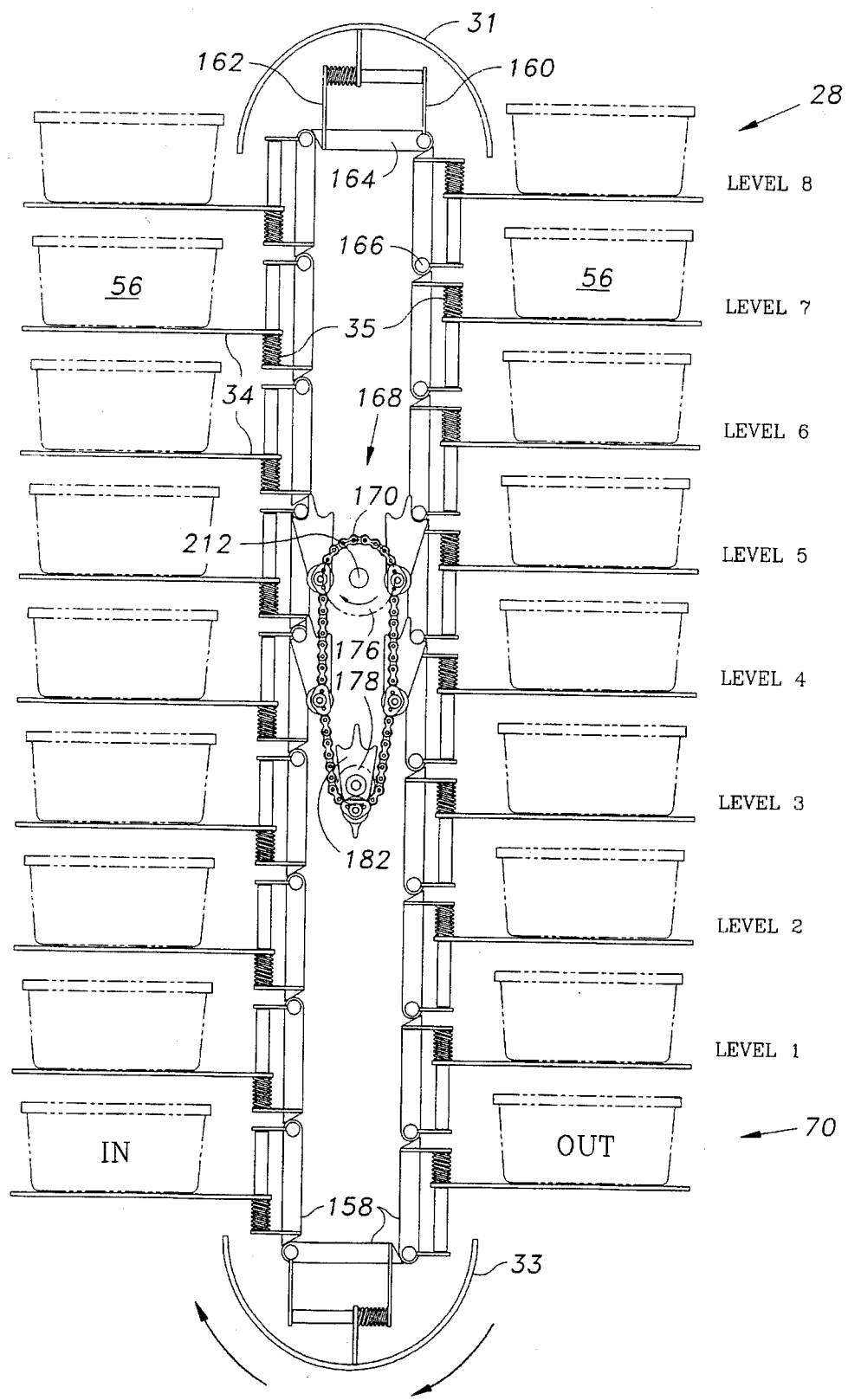

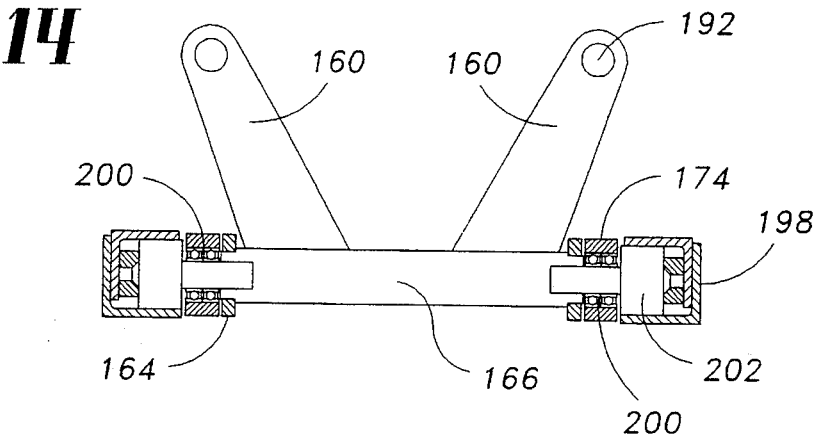
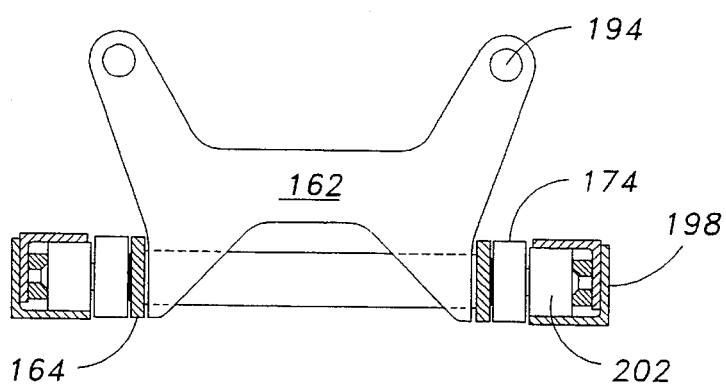
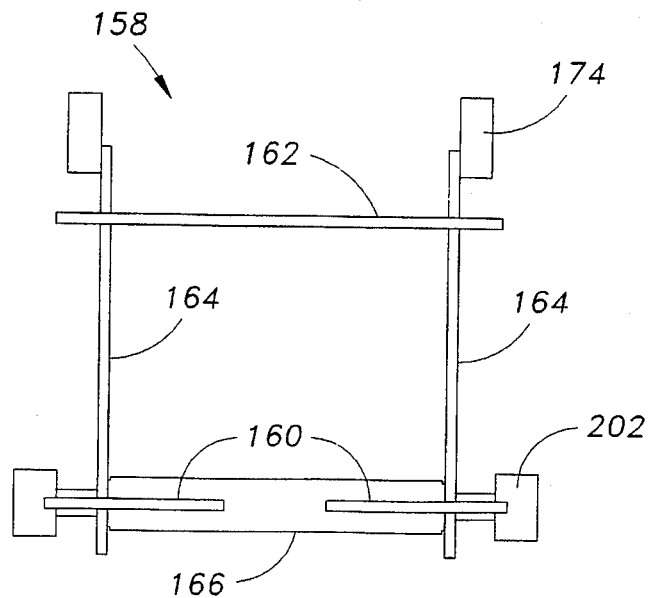

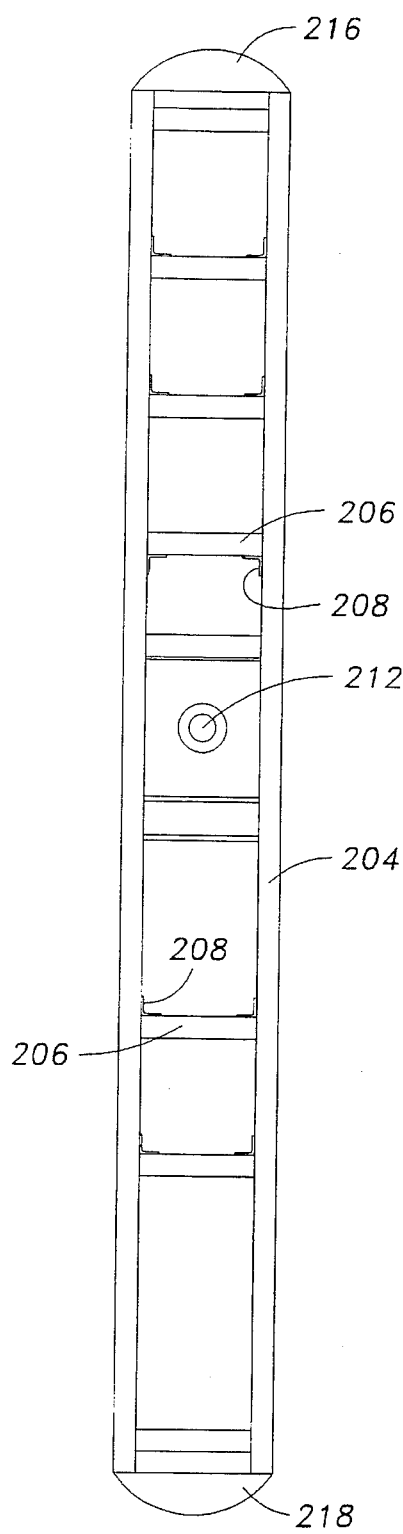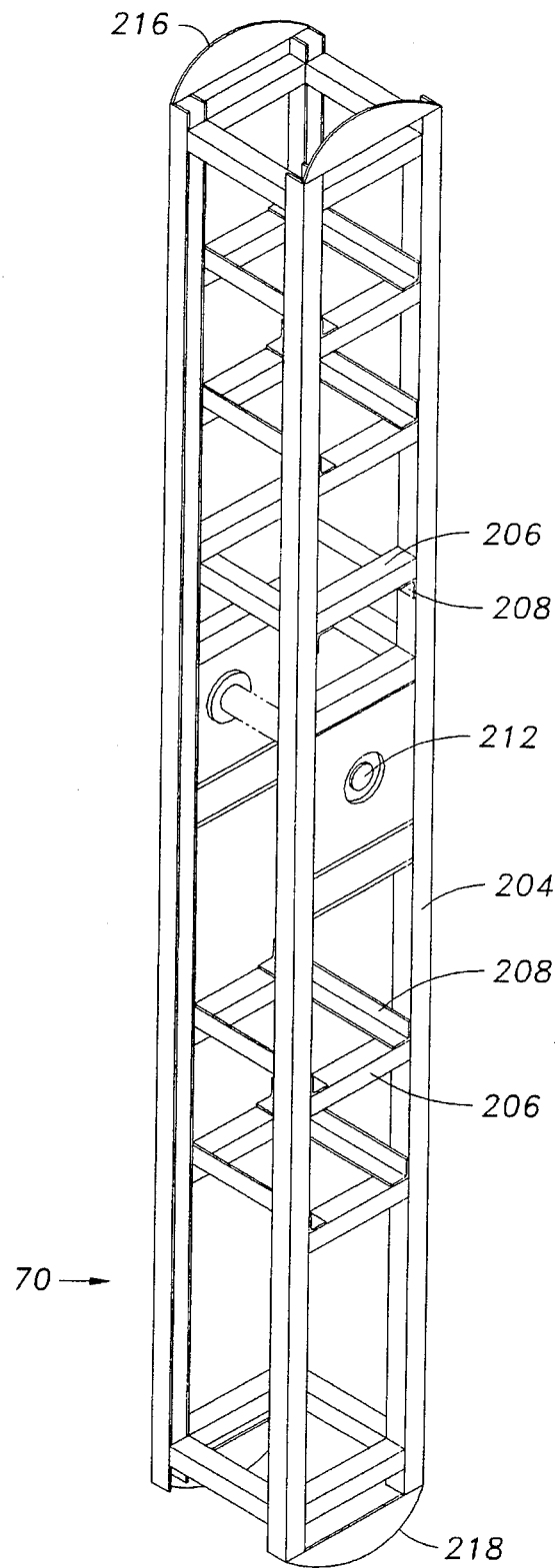
*Fig. 22*  *Fig. 23*

HIGH SPEED STORAGE SYSTEM

BACKGROUND OF THE INVENTION

1. Field of the Invention

The invention relates in general to high speed storage systems and, in particular, to high speed storage systems in which the storage is provided by a substantially continuously moving storage carousel which is spaced from a vertical lift, with communication between the storage unit and the vertical lift being accomplished by way of a continuously moving shuttle unit. The vertical lift serves to transport storage containers or other objects to be stored between a conveyor level and the desired storage level on the storage carousel.

2. Description of the Prior Art

Previous expedients where substantially continuously moving storage carousels were proposed experienced considerable difficulty in loading and extracting storage containers or other objects from the storage carousel unit. In general, very complicated and expensive insertion and extraction assemblies such as those described in Lichti, et al., U.S. Pat. No. 4,983,091, were thought to be necessary. Special container mounting assemblies and extractor or inserter mechanisms cooperating therewith were proposed, for example, in Lichti, U.S. Pat. No. 4,968,207. Matheny, et al., U.S. Pat. No. 4,561,820, proposes the use of an elevator mounted adjacent to and communicating directly with a storage carousel, thereby substantially limiting the speed of the system. These and other difficulties of the prior art have been overcome according to the present invention.

BRIEF SUMMARY OF THE INVENTION

A preferred embodiment of the high speed storage system according to the present invention comprises a substantially continuously moving storage carousel unit with associated input and output shuttle units, a vertical lift unit, and a conventional microprocessor coordinated control system. A conveyor system supplies containers to and removes them from the high speed storage system.

The storage carousel unit is provided with a multiplicity of multi-tier racks so that there is an array of storage locations on the carousel unit. The array of storage locations is generally in the form of regular rows and columns. The carousel unit is generally in the form of a link belt with each section being a rack. The sections or racks are mounted or linked edge-to-edge so as to form an endless unit. Generally, the only significant flexibility in the storage carousel unit is at the linkages or hinges between one rack and the next. The unit is mounted generally vertically on one edge. Rollers or casters are provided along the normally lower edge of the endless linked storage unit so as to support it for movement along a generally endless loop. The endless loop is generally in the form of a straight sided race track with the sides closely spaced so as to form a well between the reaches which is approximately the width of one rack. The rollers or casters which support the storage unit generally travel over the surface of a rail in a generally horizontal direction. The multi-rack multi-tier storage carousel unit is generally supported along its normally upper edge by means of rolling contact with a suitable beam.

In general, it is preferred to use a single-tier conveyor system, although multi-tier conveyor systems may be utilized if desired. Generally, separate conveyors are provided for each of the input and output sides of the system. In order to move containers or other objects from the conveyor system to the multi-tier storage carousel unit and back again, it is necessary to provide mechanisms and procedures for accomplishing this transition. It has been found that a particularly efficient system is one in which containers are received from and delivered to the conveyor system by an independently and intermittently driven vertical lift in cooperation with continuously moving shuttle units. The movements of the shuttle units are coordinated with that of the storage carousel, preferably by means of a mechanical interlinkage. In a usually less desirable configuration the shuttle unit may be driven by an independent drive which is coordinated with the carousel drive through an electrical interface.

The vertical lift functions to move the containers between the level of the conveyor system and the level of the particular tier on the storage carousel unit where the container is to be received or discharged. A shuttle unit for each of the input and output sides of the storage carousel unit carries containers between the vertical lift unit and the storage carousel unit.

Both the vertical lift unit and the storage carousel unit are provided with shelves which project outwardly so as to support containers thereon. The shuttle units are provided with forks which are configured so as to pass around or through the shelves so as to lift containers from or deposit containers on the shelves. One convenient configuration is that wherein the mating edges of the shelves and forks are scalloped. Thus, the scalloped edges of the shelves and forks intermesh without interference. The innermost lobes of the scalloped forks on the shuttle units are in a position to support the bottom edges of a container which is positioned on one of the shelves in the vertical lift or the storage carousel unit.

In general, the storage carousel unit preferably runs continuously, and preferably at a constant rate, in an endless loop in one direction, normally horizontally. In a usually less preferred configuration the rate at which the carousel unit runs may be varied or intermittent to accommodate special insertion and extraction requirements. Usually, if the rate at which the carousel unit runs is varied or intermittent a shuttle disengagement clutch is provided to protect the shuttle units from acceleration loads which would possibly dislodge or misplace containers on the shuttle units. The vertical lift unit runs intermittently and at variable speeds in an endless loop in one direction, normally vertically. The shuttles move back and forth continuously in synchronization with the storage carousel unit along straight lines between the vertical lift unit and the storage carousel unit, reversing their direction of travel at the end of each traverse. In general, it is preferred to position the input and output conveyor units so that they deliver containers to and receive containers from the vertical lift unit at a level which is below that where the forks of the shuttle units operate. In this way, extraction and insertion between the shelves of the vertical lift unit and the conveyor system can be accomplished without any interference from the forks on the shuttle units.

Preferably, a conventional microprocessor coordinated control system maintains a current inventory of where each container is within the overall system and coordinates the movement of the vertical lift unit with the rest of the system. Conventional microprocessor hardware and software are conveniently used to accomplish coordination and control.

Preferably, the storage carousel unit and the shuttle units are synchronized by means of a mechanical interlink. The movement of the vertical lift unit is preferably coordinated through the microprocessor and the vertical lift is independently driven. The conveyor system is coordinated with the movement of the vertical lift, preferably through the microprocessor.

The forks on the shuttle units are actuated to acquire or release storage containers by moving vertically for a short distance. Each pair of forks on both the input and the output shuttles is driven independently of the other pairs of forks. That is, each fork may be actuated to remove or deposit a container on a shelf independently of the other pairs of forks. Thus, any one or all of the fork units may be actuated to transfer containers between the storage carousel unit and the vertical lift unit as the shuttles move through one full cycle from a position operatively adjacent the vertical lift unit to a position operatively adjacent the storage carousel unit and back to the vertical lift unit. In general, the mechanical linkage between the shuttle units and the storage carousel unit is such that the shuttle units are driven through one complete cycle as the storage carousel unit moves along its endless path for the length of one rack or link. The forks are preferably driven vertically by the same drive which moves the storage carousel unit and the shuttle units so synchronization with the movements of the vertical lift and the storage carousel is maintained by the mechanical linkage.

The movement of the conveyor system is coordinated, preferably through the control microprocessor, with that of the vertical lift. Extending the vertical lift to at least one level below those at which the forks on the shuttle units operate and using these lower levels for input to and extraction from the conveyor system substantially enhances the efficiency of the system and thus the speed at which articles may be handled.

The storage carousel unit is generally arranged so that there are two reaches which run parallel to one another. The container transfer operations generally take place at one end of the race track like path which the storage carousel follows where the racks turn 180 degrees from the approaching to the departing reach. In general, containers are preferably extracted from the storage carousel unit at the end of the approaching reach just before it starts its turn. Containers are preferably inserted onto the storage carousel unit at the beginning of the departing reach just after it has completed its turn.

The storage carousel unit is preferably driven along its endless path by a drive assembly which is located in the well between the generally parallel approaching and departing reaches. In general, the storage carousel drive assembly engages and locks with one or more protrusions on one or more of the racks, drives the racks for a short distance along the endless path and then releases from the protrusions and engages with similar protrusions on the following racks. The drive assembly preferably engages with the protrusions on a few of the racks which are instantaneously in both the approaching and departing reaches. Preferably, the drive assembly engages with only one to three racks in each reach at any point in time even though there may be as many as 20 or more racks on each reach. The drive assembly positively engages with and locks to the protrusions on the racks for safety purposes. In the event of an earthquake, this positive interlocking will serve to hold the storage carousel unit in its proper location on the track which supports it.

In a preferred form, the mechanical drive for the storage unit consists of a short endless roller chain drive which sets in the well between the two reaches of the conveyor. Specially configured dogs carried by the chain are guided by a cam into engagement with the protrusions on the racks.

The same motor preferably drives the mechanical drive for the storage unit, the shuttle units and vertical actuator for the shuttle forks. If desired a single position clutch may be provided in this drive chain to permit the disengagement of the shuttle units or the vertical actuator for the forks or both from the storage carousel drive. This permits the storage carousel to be handled separately for purposes of maintenance or special storage handling situations. The single position clutch assures that the system will be in proper synchronization when the mechanical interlinkage is reestablished.

The vertical lift is driven by an independent drive assembly which is, for example, conveniently located between the ascending and descending reaches of the vertical lift. The vertical lift is typically driven from full stop to relatively high speed and back to full stop one or more times while the shuttle units traverses one cycle between the vertical lift and the storage carousel. In general the lift forks in the vertical lift are stationary while storage containers are being inserted and extracted from the vertical lift.

In a preferred form, the lift drive assembly comprises an endless chain drive which carries dogs or pawls which, when acting together, positively engage with parts of the carriages for the lift forks. Pawls on the ascending reach of the endless chain drive engage with carriages for lift forks which are instantaneously on the ascending reach of the vertical lift, and pawls which are on instantaneously on the descending reach of the endless chain drive engage with carriages which are on the descending reach of the vertical lift. As with the drive for the storage carousel unit, this positive engagement provides a measure of safety in the event of an earthquake. Also, since movement of the vertical lift must be rapid and intermittent, the drive must positively engage and interlock with the reaches of the lift to accommodate the rapid acceleration and deceleration loads. The vertical lift may accelerate from a full stop and travel through a distance equal to the spacing between two or three or even more shelves and then decelerate to a full stop one or more times while the shuttle is making one full cycle. In this way, the vertical lift is able to accommodate both loading and unloading operations in the same shuttle cycle which greatly enhances the efficiency and speed of the system.

If desired, the width of the vertical lift may be increased so that space for a second storage container is provided on each lift fork. Generally, in a double wide vertical lift the shuttle interacts with the storage container which is closest to the storage carousel unit, leaving the adjacent space on the double wide lift fork on the vertical lift available for momentary storage and handling of containers. Alternatively, the forks of the shuttle unit may interact with both shelves on a double-wide vertical lift unit.

According to one embodiment a simple stationary set of shelves may be interposed between the storage carousel and the vertical lift for purposes of temporarily holding storage containers. Under ordinary circumstances such a temporary holding area is not needed. Under extreme circumstances where the storage container is being operated at or near full capacity, efficiency may be improved and the capacity of the system increased somewhat by the use of a temporary holding area particularly on the input side. Where such a stationary set of shelves is provided two sets of forks are provided on the associated shuttle. One set of forks serves to move containers from the storage carousel to the stationary shelves and the other set moves the containers from the stationary shelves to the vertical lift.

The shuttle units on the input and output sides generally move continuously and in unison along a generally horizontal path between the storage carousel and the vertical lift. The shuttle units are preferably structurally interlinked by a common frame and share a common drive so that they stay synchronized with one another.

The shuttle unit support members or forklifts are selectively and individually driven through their lifting and depositing cycles. The actuating mechanism for so individually driving the shuttle unit forklifts preferably comprises, for example, an independently actuated latching mechanism for each individual forklift which is adapted to engage with a continuously operated free running member. When actuated, the latching mechanism for a specific individual forklift engages with the free running member which carries that individual forklift through its lifting and depositing cycle, and then releases it. The free running member runs continuously through the lifting and depositing cycle with every horizontal cycle of the shuttle unit. The individual forklifts only run through the lifting and depositing cycle when they are releasably latched to the free running member for a particular cycle. When not so latched they merely run horizontally with the shuttle unit. The path which the free running member follows through the lifting and depositing cycle is defined, for example, by a cam, or by any other suitable means.

When a particular forklift actuating mechanism is engaged for a particular cycle on the output side of the storage carousel unit, the forklift lifts the box or other item off of the storage shelf on the storage carousel, moves it over and deposits it on a vacant support member on the vertical lift unit. On the input side of the storage unit, the reverse occurs with the forklift lifting the container off the vertical lift and depositing it on an empty site on the storage carousel.

The conventional software which is utilized by the microprocessor in controlling the system causes the system to look ahead so that there is always an empty space on the vertical lift which will be in position to receive a storage container when the forklift on the output side reaches the vertical lift. The reverse occurs on the input side of the storage unit so that there is always a vacant shelf on the storage carousel for the storage container.

The storage containers are conveniently moved between the conveyor units and the vertical lift unit by means of power driven rollers which are positioned to act upon the containers to drive them on or off of the shelves on the vertical lift at the conveyor-vertical lift transfer level. In general, the power driven rollers intermesh with the forks which comprise the shelves for the vertical lift at the conveyor-vertical lift transfer level. If desired, other insertion and extraction means may be employed, such as, for example, pusher arms, and the like.

The storage system according to this invention is particularly well suited to operations where containers are continually inserted and extracted from the storage carousel. If desired, this storage system may be utilized under operating conditions where the storage carousel is fully loaded in one continuous phase and is later unloaded in one continuous phase.

BRIEF DESCRIPTION OF THE DRAWINGS

Referring particularly to the drawings for the purposes of illustration and not limitation:

FIG. 1 is a diagrammatic plan view of a preferred embodiment of the invention.

FIG. 2 is a diagrammatic elevational view of the preferred embodiment of FIG. 1 with the vertical lift and output shuttle omitted for purposes of clarity.

FIG. 13 is a simplified elevational view of the vertical lift unit showing the lift carriages and drive unit without the supporting frame and linking connections.

FIG. 14 is a partial cross-sectional plan view of the lift drive bar and associated shelf supports.

FIG. 15 is a partial cross-sectional plan view of the lift shelf supports and associated structure.

FIG. 16 is a front elevational view of a lift fork carriage.

FIG. 22 is an elevational view of the frame of the vertical lift unit without the drive assembly or lift carriages installed.

FIG. 23 is a perspective view of the vertical lift frame without the drive unit and the lift fork carriages.

FIG. 26 is a simplified view of the extraction drive chain for the output side of the vertical lift taken along line 26 in FIG. 25a.

DETAILED DESCRIPTION OF THE PREFERRED EMBODIMENTS

Figure 6:
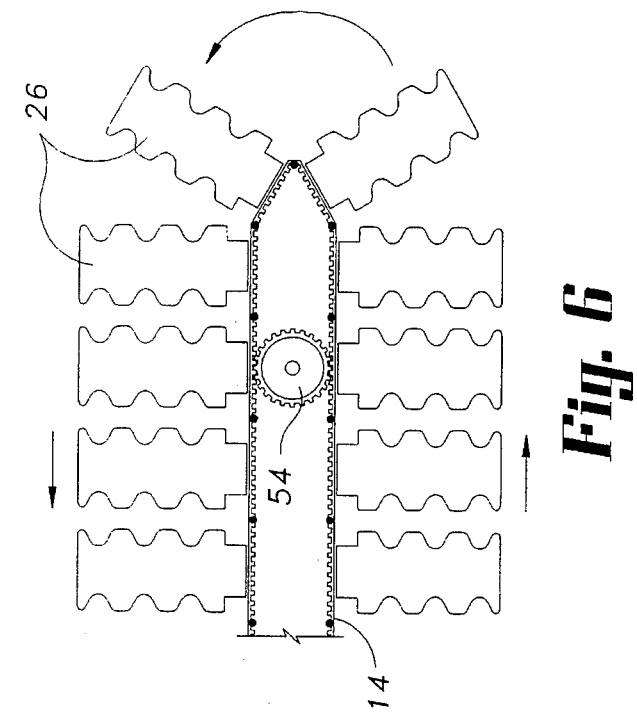
FIG. 6 is a fragmentary diagrammatic plan view similar to FIG. 2 showing the transfer end of the storage carousel unit with two racks part way through the transition from the approaching to the departing reach.

In the preferred embodiment which has been selected for purposes of illustration, there is illustrated generally at 10 a storage system. Storage system 10 comprises a storage carousel unit indicated generally at 12, vertical lift unit 28, and input and output shuttle units, 30 and 32, respectively. Input and output conveyors, 22 and 24, respectively, deliver items to be stored to storage system 10 and remove items from storage system 10 when they are to be retrieved from storage. Vertical lift unit 28 operates within transfer zone 20 to transport storage items vertically between the level of the conveyor units and the levels where the items are to be stored of the storage conveyor. The shuttle units 30 and 32 operate within transfer zone or location 20 to carry storage items at constant levels directly between the vertical lift 28 and the storage carousel 12, preferably, without the use of any holding area. Preferably, the conveyor units interact with the vertical lift unit at a level which is below or at least different from that at which the shuttle units interact with the vertical lift. For purposes of illustration a system will be described which has a transfer zone at only one end of the carousel unit. It will be understood by those skilled in the art that a second transfer zone could be provided at the second end of the carousel unit. For ease of understanding each of the units will first be described somewhat generally with reference to very diagrammatic drawings and then the details of the various units will be addressed with reference to more detailed drawings. In order to avoid obscuring the invention with too much detail, throughout the drawings conventional details such as supporting brackets, chain tighteners, and the like, have been omitted unless necessary to an understanding of the invention.

Figure 7:
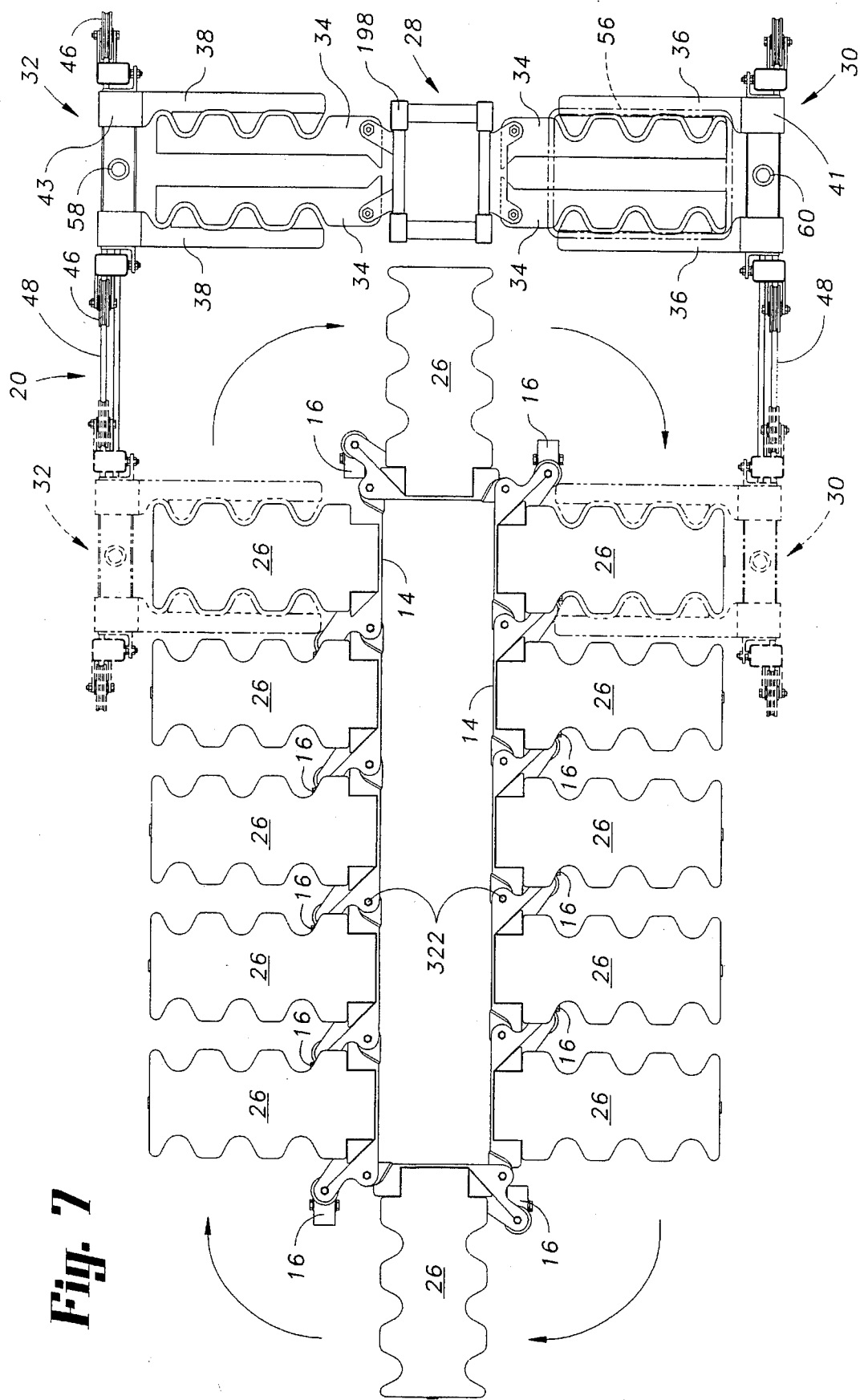
FIG. 7 is a simplified plan view of a storage carousel, vertical lift unit and shuttle units.
Figure 8:
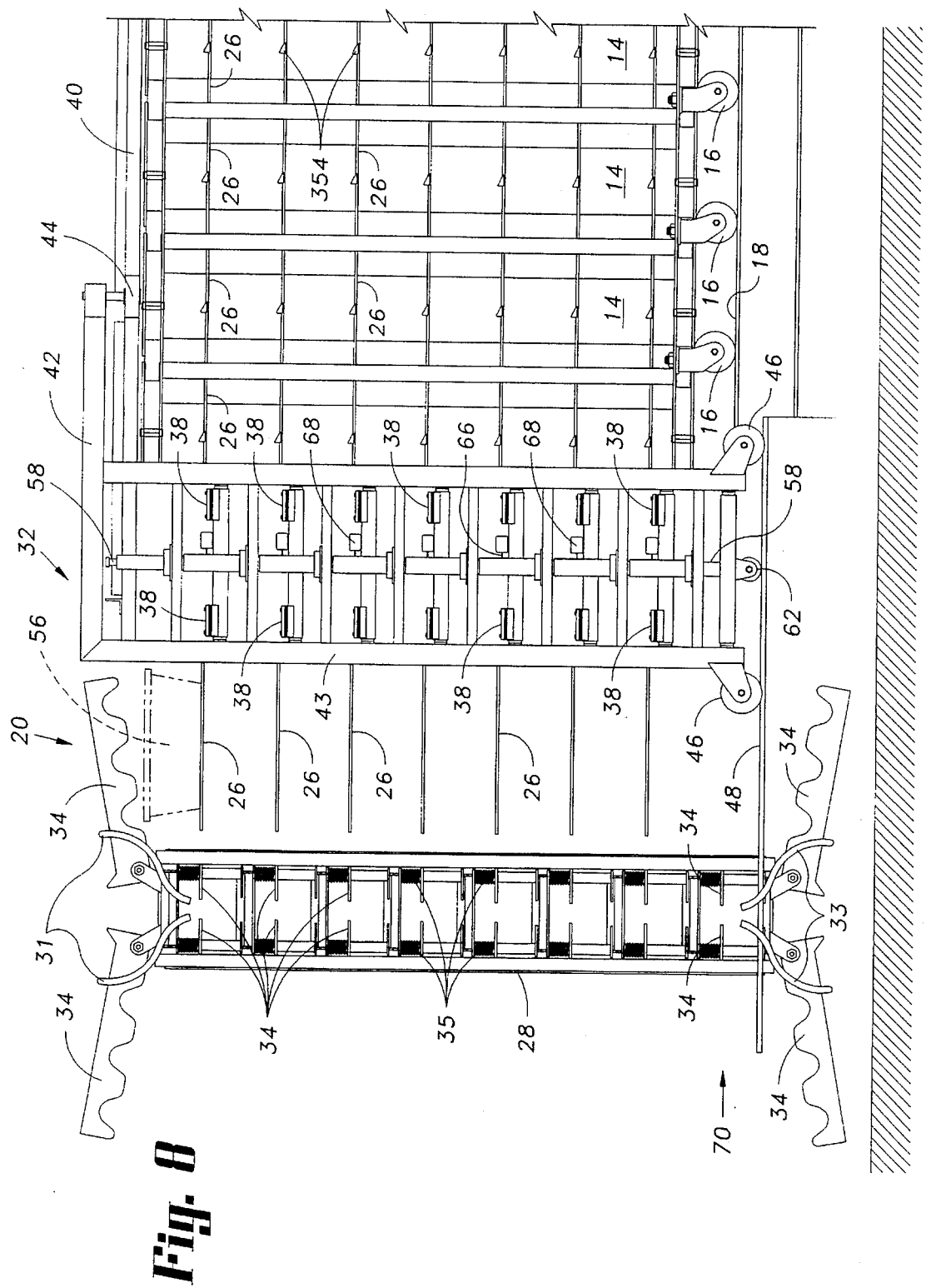
FIG. 8 is a simplified elevational view of a storage carousel, vertical lift and shuttle unit.
Figure 9:
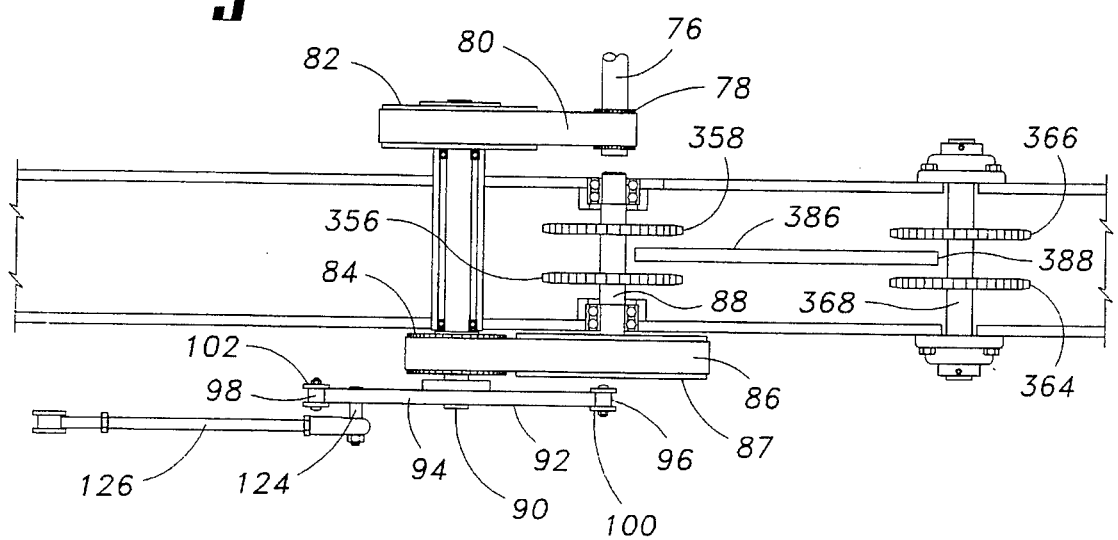
FIG. 9 is a simplified elevational view of the elements of the mechanical drive for the storage carousel and shuttle units.
Figure 10:
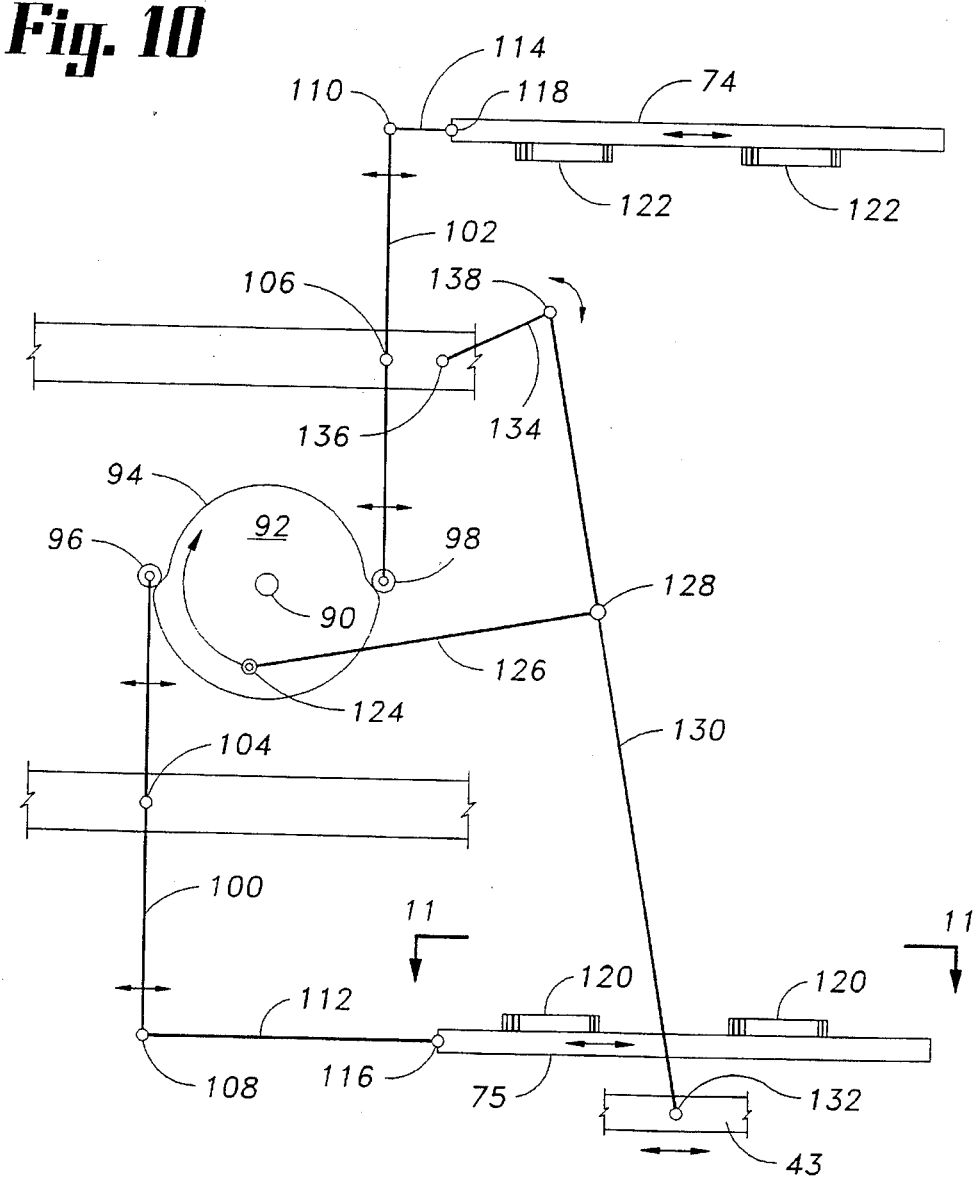
FIG. 10 is a simplified plan view of the elements of the mechanical drive for the shuttle units.
Figure 11:
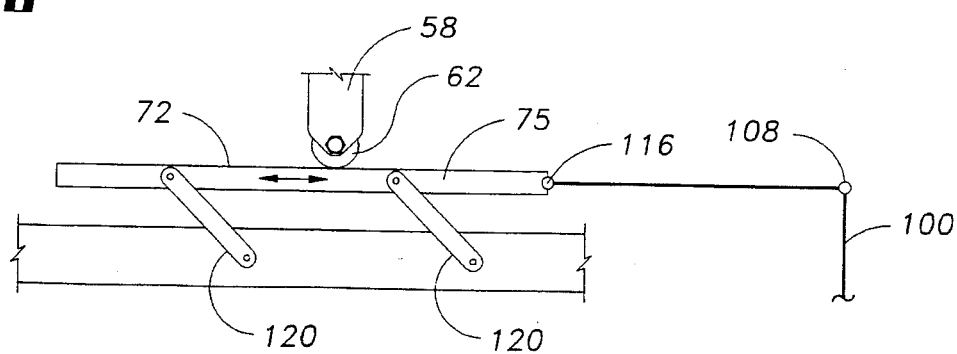
FIG. 11 is a simplified partial elevational view of the shuttle fork actuating mechanism.
Figure 17:
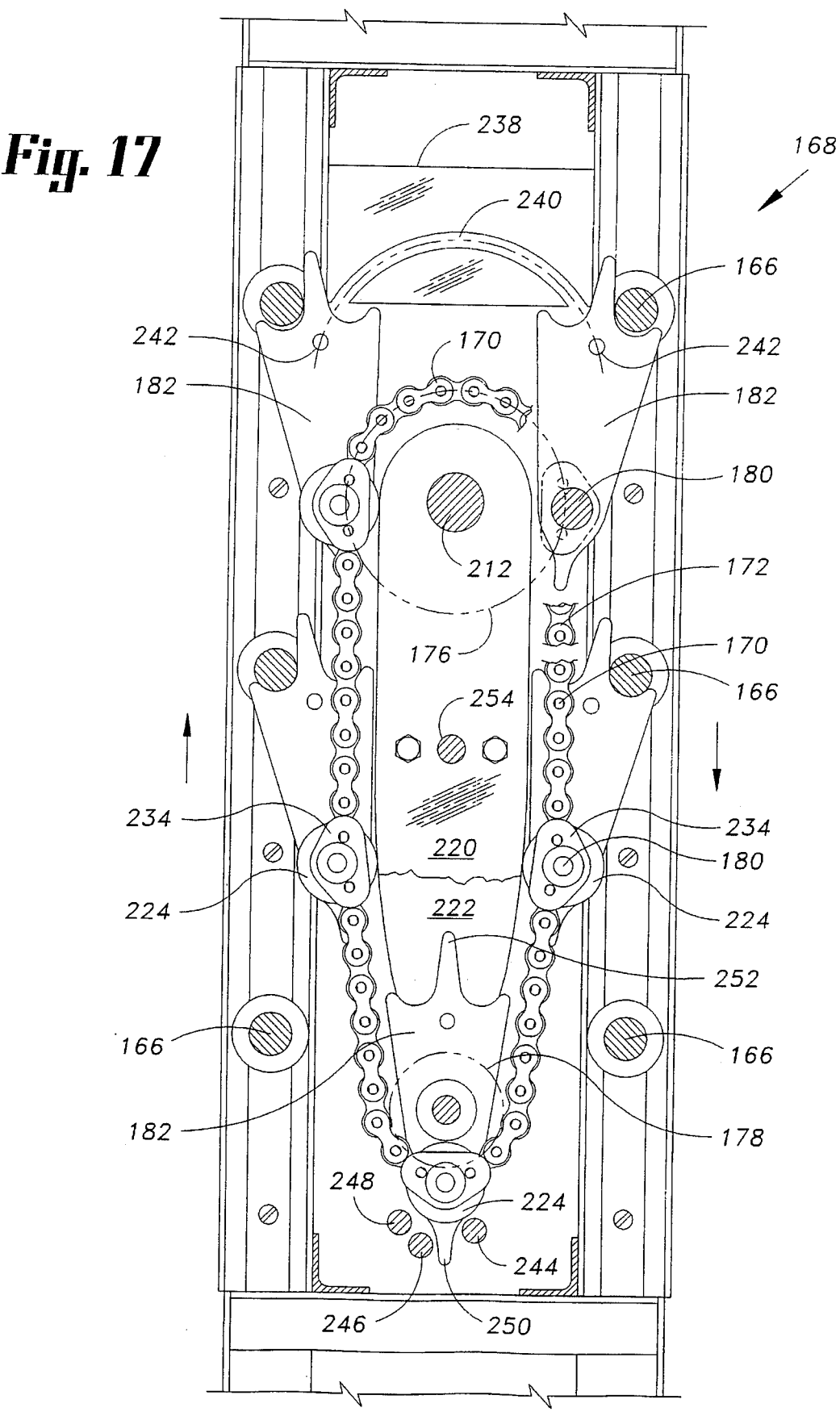
FIG. 17 is a simplified side elevational view of the lift drive assembly.

In FIGS. 1 through 6, the system is shown in very diagrammatic form so as to facilitate an understanding of the invention, particularly as to the various units and their cooperation with one another, as well as their operation. In FIGS. 7 and 8 the structural detail has been simplified, again, to facilitate an understanding of the invention. FIGS. 9 and 10, which show the drive mechanism and mechanical interlinkage between the storage carousel unit and the shuttle units have likewise been simplified for purposes of clarity.

Storage carousel unit 12 is in the form of a series of racks or panels hingedly joined edge-to-edge in the form of a continuous link belt which is mounted on one edge by means of wheels or casters 16 for movement over track 18 along an endless generally horizontal path. The upper edge of storage carousel unit 12 is supported by an overhead beam 40, preferably by the engagement of rollers or wheels on the normally uppermost edge of storage carousel unit 12 with a track which is carried by overhead beam 40. The track 18 is mounted on a solid carefully leveled foundation so that the fully loaded storage carousel unit 12 is adequately and levelly supported for smooth movement. Likewise, overhead beam 40 is carefully positioned and leveled so as to support the upper edge of storage carousel unit 12. In one convenient embodiment, the overhead beam 40 is supported on conventional pedestals or vertical beams 15, which, for example, extend upwardly within the well which is defined between the approaching and departing reaches of storage carousel unit 12. See, for example, FIGS. 1, 2, 3, 6, 7, 8, 28, 29 and 30.

In general, the reaches of the endless path are parallel to one another for at least a substantial part of the endless loop or path along which the storage carousel unit moves. One end of the generally elongated storage carousel unit is positioned at a transfer location indicated generally at 20. Storage containers or other objects are transferred to and from storage locations on the storage racks 14 at transfer location 20. The storage containers or other objects are supported on racks or panels 14 by means of an array, for example, of carousel shelves, typical examples of which are indicated at 26. Other support means may be used if desired. All of the carousel shelves 26 in a single tier on storage carousel unit 12 are generally positioned in approximately the same plane to form a row of support means. There may be as many as 30 tiers of shelves, more or less, in storage carousel unit 12. The spacing between the carousel shelves 26 is determined by the height of the containers and the necessary operating clearance. The clearance is generally approximately three inches. The bottoms should be generally flat and of a size to be carried by the respective shelves and forks. Specially designed containers are not required since the containers simply rest on the shelves. The system permits great flexibility in the design of the support means-container combination. Special support means and mating containers may be used if desired. The system is very flexible as to scale. There may be as few as 10, or less, and as many as 100, or more, racks in a typical storage carousel unit. Thus, a typical storage carousel unit may provide from 100, or less, to 2,000, or more, storage locations in a relatively small space, all easily and quickly accessible. Where all of the storage shelves are to be loaded or cleared at one time it generally requires less than 2 full revolutions of the carousel unit to accomplish such loading or unloading.

The carousel storage unit is driven by a drive assembly 54 which is located between the approaching and departing reaches of unit 12 preferably at the lower edge of the storage carousel. The carousel drive assembly is in concept a toothed gear which engages pins on the normally lower edge of racks 14 on both the approaching and departing reaches. A toothed gear is illustrated only to facilitate an understanding of the concept. In the preferred embodiment, instead of a simple gear, an arrangement of latching pawls carried by a roller chain are utilized, as described more specifically hereinafter, in order to provide earthquake safety. The toothed gear is driven so that its engagement with the mating elements on racks 14 causes the entire storage carousel unit 12 to move along the endless path which is defined by track 18 and overhead beam 40. Only one drive for the storage carousel is needed so any need to coordinate the actions of two or more drives is eliminated. For certain installations, such as very large systems, more carousel drives may be used, if desired. Under such circumstances a conventional electrical interface should be used between the drives to keep them coordinated with one another. According to the present invention, at a rate of 10 feet per minute for a carousel with 24 vertical levels the storage system according to the present invention can easily maintain an output-input rate of 1,200, or more, containers per hour.

Containers or other objects are delivered to storage system 10 by means of input conveyor unit 22. Containers are removed from storage system 10 by means of output conveyor unit 24. The conveyor units generally operate on one or, at the most, two levels. Thus, some means must be provided to transport a container vertically to and from the level of the conveyors to the level of the tier of shelves on storage carousel unit 12 where the shelve 26 upon which the container will be stored is located. Moving containers through transfer location 20 without a holding station and at as rapid a rate as the storage carousel unit can accommodate them is an important objective of this invention. Very significant efficiencies are achieved by providing an intermittently and independently driven vertical lift 28 for moving storage containers generally vertically, operating in conjunction with a pair of shuttle units, 30 and 32, respectively, which are driven continuously in synchronization with the movement of storage carousel unit 12 for moving storage containers generally horizontally between the vertical lift and the storage carousel unit 12. Once a container has been identified for transfer into or out of the system it moves through the transfer location 20 without the need for any holding station, although holding may be provided, if desired, by the inclusion of a simple set of stationary shelves intermediate the vertical lift unit and the storage carousel unit 12.

Vertical lift unit 28 moves containers in a generally vertical direction between the conveyor units 22 and 24 and the desired tier of shelves on storage unit carousel 12. Input shuttle unit 30 is provided to transfer containers laterally between the vertical lift unit 28 and the desired tier of shelves on storage unit carousel 12. Likewise, output shuttle unit 32 transfers containers from the shelves on storage carousel unit 12 to vertical lift unit 28. Preferably, the ascending reach of vertical lift 28 is on the input side of the system and the descending reach is on the output side.

In the preferred embodiment, where the vertical lift unit 28 is capable of being driven at such a rate that at least two, and as many as ten or more, levels of lift forks, typical ones of which are indicated at 34, reach the level of the conveyor system during one cycle of the shuttle unit, a great many containers may be transferred very quickly. The lower level, indicated generally at 70, of vertical lift 28 is cleared very quickly onto output conveyor unit 24 as several levels of lift forks 34 on the downward reach of vertical lift 28 move through lower level 70 during each cycle of the shuttle units 30 and 32. Likewise, several containers can be loaded onto the input side on the upward reach of lift 28 from conveyor 22 during each shuttle cycle. Transfers between the conveyor system and the vertical lift unit are conveniently accomplished through the use of simple pusher arms, not illustrated. Alternatively, driven rollers may drive the containers onto and off of the lower level 70 of vertical lift unit 28.

The vertical lift 28 generally runs in only one direction. Thus, the lift forks 34 on vertical lift unit 28 pass underneath and over the top of the vertical lift unit as they transition between the upwardly and downwardly extending reaches of the vertical lift unit. If desired, the lift forks 34 on vertical lift unit 28 may be pivotally mounted so they swing outwardly as they reverse directions between the two reaches. See, for example, FIG. 8. This thus reduces the overall vertical clearance which must be provided for the vertical lift unit. The pivotally mounted members 34 are biased by springs 35 into operative position. A pair of upper guides 31 engage members 34 as they approach the top of vertical lift 28 on the ascending reach and force them to pivot outwardly against the force of springs 35. As members 34 pass over the upper end of lift 28 onto the downward reach of lift 28 the guides release them and springs 35 swing them back into operative position to receive and support containers. Similarly, a pair of lower guides 33 act on members 34 at the lower end of unit 28 to guide members 34 around the bottom of lift 28 between the descending and ascending reaches of the lift. Where vertical clearance for the lift 28 is not a concern the members 34 may be fixed rigidly to their carriages so they swing around the ends without pivoting. Containers are not carried between the ascending and descending reaches of unit 28 so the members 34 must be cleared before they reach the top and bottom, respectively of the lift 28.

The drive for the vertical lift unit, as with the storage carousel unit, drives the moving lift elements on the ascending reach and supports them on the descending reach, which enhances the safety of the system. Also, this engagement permits the lift forks to be moved and stopped quickly. The drive assembly for the vertical lift unit consists of a pair of specially configured chains which carry pawls that engage with and drive the moving mechanism on the ascending reach of the vertical lift and let the descending reach down, as will be described in greater detail hereinafter.

While in transit through transfer zone 20 the containers are conveniently supported on the vertical lift and shuttles by means of shelves or forks which are adapted to engage the containers without interfering with one another. The vertical lift unit 28 is provided with shelves in the form of container support members or lift forks, typical ones of which are indicated at 34. Input shuttle unit 30 is provided with container support components or shuttle input forks, typical ones of which are indicated at 36, which are adapted to lift containers from lift forks 34 on the input side of the storage system 10, transfer them to and deposit them on shelves 26 on racks 14 of storage carousel unit 12. Likewise, container support parts or shuttle output forks 38 are provided on output shuttle 32 which function to lift containers from shelves 26, transfer them to vertical lift unit 28 and deposit them on lift forks 34 on the output side of storage system 10.

It is apparent how the scalloped edges of the lift forks 34 and the carousel shelves 26 intermesh with the mating scalloped edges of the shuttle input forks 36 and shuttle output forks 38 so that storage containers may he lifted from and deposited on the shelves and support members without interference. These intermeshed scalloped edges make possible the efficient placement and removal of containers on storage carousel unit 12 and vertical lift 28 by, for example, simply moving the structures which include shuttle input forks 36 and shuttle output forks 38 along the rectangular input and output paths 50 and 52, respectively.

The shuttle input and output forks, 36 and 38, respectively, on the shuttle units travel along paths which include both horizontal and vertical components as they move through a full operational cycle from the vertical lift unit 28 to the storage carousel unit 12 and hack again. The shuttle input forks 36 on the input side of storage system 10, when actuated, follow the input path indicated generally at 50, FIG. 4. When the container support shuttle output forks 38 on the output shuttle 32 are actuated, they move generally along the output path indicated at 52, FIG. 5. When a particular shuttle element or fork is not actuated, it simply moves hack and forth in an idle cycle in a straight line, generally below the location of the shelves 26 on racks 14. It is only when a particular shelf is actuated that it moves through either path 50 or 52 to pick up a container move it to a new location and then deposit it.

The shuttle output forks 38 are caused to move through output path 52 by means of selective and individual engagement with free running vertical drive member 58. See, for example, FIGS. 7 and 8. Free running vertical drive member 58 is mounted for free sliding axial movement within the cross-members of output shuttle frame 43. Vertical drive member 58 also passes through and is releasably engageable with the cross-members to which the shuttle forks are mounted. In FIGS. 7 and 8 the mechanism is shown very diagrammaticly for ease of understanding. For a more detailed illustration of the shuttle fork assembly attention is invited to FIGS. 37–40. Each set of shuttle output forks is provided with a solenoid 68 which serves to actuate a solenoid actuated pin 66. When actuated a particular pin 66 projects through the cross-member for the shuttle forks and engages vertical drive member 58, thus locking the particular set of shuttle forks to member 58. When member 58 moves vertically while so locked it carries the shuttle forks with it. The construction and operation of free running vertical drive member 60 in cooperation with input shuttle frame 41 and input shuttle forks 36 is the same. The details of the drive for drive members 58 and 60 will be described in more detail hereinafter. As will be understood by those skilled in the art other means for driving the shuttle fork assemblies, both horizontally and vertically, individually and collectively, may he employed, if desired.

The input and output shuttle frames 41 and 43, respectively, of shuttle units 30 and 32 are structurally bound together at their normally uppermost edges by shuttle frame 42 (FIGS. 2 through 5) which extends between the respective shuttle units. Shuttle frame 42 is guided by means of rollers 44 along overhead beam 40 which is shared with carousel 12 and may be shared with vertical lift 28. Frames 41 and 43 are constructed, for example, in a generally ladder like form with shuttle forks 36 and 38 mounted thereto for vertical movement between the cross-braces of the frames 41 and 43. The shuttle units 30 and 32 are moveably supported at their normally lower edges on shuttle tracks 48 by means of grooved wheels 46. Grooved wheels 46 are configured to mate with the contour of the upper surface of shuttle tracks 48 so as to guide the lower edges of the shuttle units in the desired straight paths.

Figure 5:
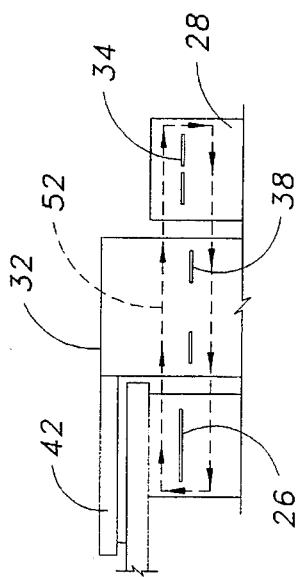
FIG. 5 is a fragmentary diagrammatic elevational view similar to FIG. 3 showing the path which the forks on an output shuttle unit follow in one cycle on the output side of the storage carousel.
Figure 3:
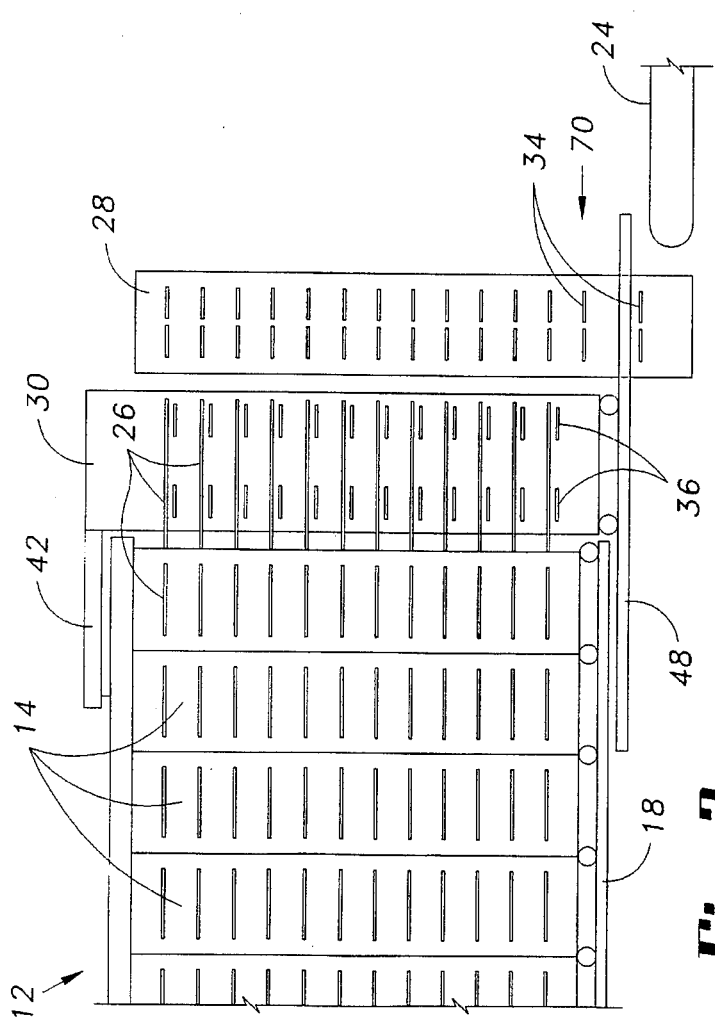
FIG. 3 is a fragmentary diagrammatic elevational view similar to FIG. 2 showing an input shuttle unit at an intermediate location between the storage carousel unit and the vertical lift unit.
Figure 4:
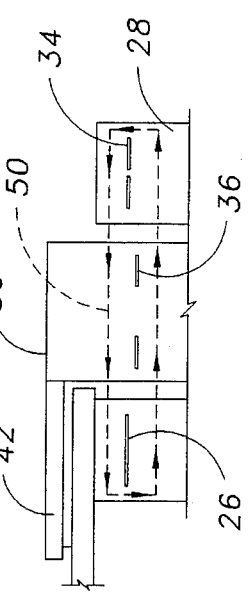
FIG. 4 is a fragmentary diagrammatic elevational view similar to FIG. 3 showing the path which the forks on an input shuttle unit follow in one cycle on the input side of the storage carousel.

In FIGS. 3 through 5, for example, the shuttle units are illustrated at an intermediate location between the vertical lift unit 28 and the storage carousel unit 12. Illustrated particularly in FIGS. 3 and 8, the vertical lift unit 28 extends at least one shelf level below the lowest tier of output forks 38 on output shuttle unit 32 to provide a lower level, indicated generally at 70. Containers may thus be transferred between the instantaneously lowermost lift forks 34 and the conveyor system without concern as to any interference with the shuttle units. The efficiency and speed of the system are substantially enhanced by the provision of lower level 70. In FIGS. 3 and 4 the output shuttle unit 32 has been omitted for purposes of clarity of illustration. If desired, the transfer station could be placed, for example, above the area where the shuttle forks operate, or at some intermediate level where there are no shuttle forks.

Referring particularly to FIG. 7, the shuttle units 30 and 32 are shown, once in phantom and once in solid lines, in operative position with both the vertical lift unit 28 and the storage carousel unit 12. Note that in FIG. 7 the carousel storage unit 12 is indicated to be moving in the opposite direction to that illustrated in FIG. 1, and the positions of the input and output shuttles are, therefore, reversed. Storage container 56 is shown in phantom lines on lift forks 34 on vertical lift 28 at the moment of engagement with shuttle input forks 36 on input shuttle unit 30.

As the racks 14 change direction from the approaching reach to the departing reach of storage carousel unit 12 within transfer zone 20, they move on casters 16 through an arc which brings the racks 14 through the configuration illustrated, for example, in FIG. 6. The shuttle units are timed so that the shuttle forks carrying containers clear the carousel shelves 26 and any containers thereon as they swing through transfer zone 20.

The various units are controlled and tracked through a conventional microprocessor unit using conventional software in such a way that the system knows where each container in the high speed storage system is located at all times, and what the positions of the various container supporting and handling elements of the system are. The microprocessor system preferably looks ahead to determine that there are empty shelves or forks to receive the containers which are being handled within the storage system. The controls do not need to be adapted to control the horizontal movement of either the carousel unit or the shuttle units. These units are preferably mechanically interlocked and driven horizontally at a continuous rate. Intervention of the control system is necessary in order to actuate the respective input and output cycles 50 and 52 of the individual shuttle input and output forks, 36 and 38, respectively. In general, the control system directly controls the movement of the vertical lift 28. The intermittent movement of lift forks 34 on vertical lift unit 28 must be coordinated by the control system with the horizontal and vertical movements of the shuttle input and output forks, 36 and 38, respectively, as well as with the locations of specific containers and empty shelves on racks 14. The containers or other objects are all provided with some unique identification such as, for example, a bar code. That bar code is read by conventional means as the container enters the input or leaves the output side of the storage system 10 and the information is processed by the microprocessor. Once identified on the input side, a storage container is kept track of electronically by conventional means until it exits the output side of storage system 10. The control system is aware, electronically, moment by moment, whether a particular location in a unit is open or occupied, and if occupied, what the identification of the specific container is. The control system looks ahead and will not allow the vertical lift to accept a container on the input side until it can be moved through the transfer location 20 to a shelf 26 on storage carousel unit 12. Likewise, the control system looks ahead and will not remove a container from a shelf 26 until it can be passed through transfer location 20 to the output conveyor 24. If desired the system could be operated, coordinated and controlled manually at a very slow rate by several people working together, although with substantial loss of efficiency, capacity and accuracy.

Figure 28:
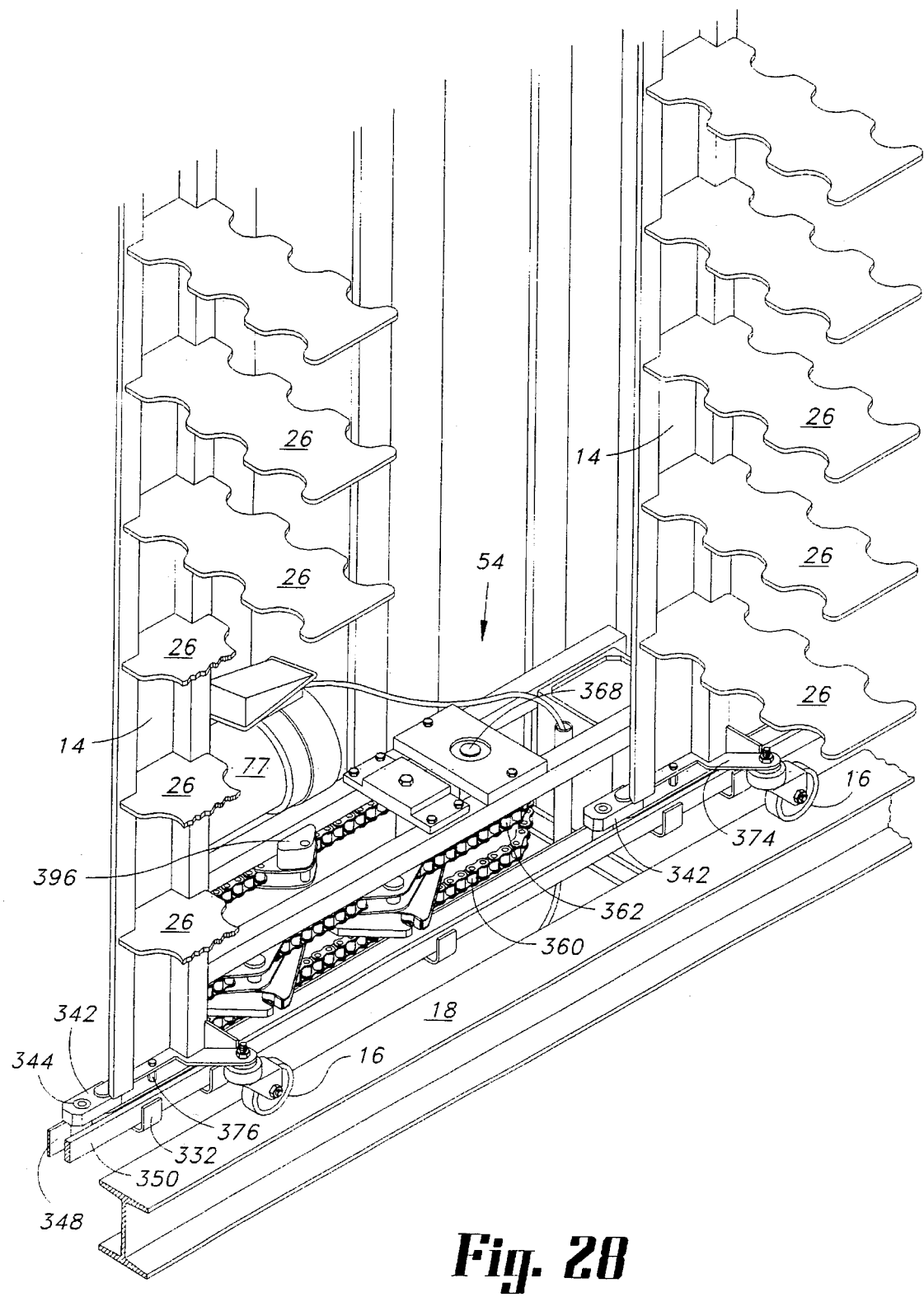
FIG. 28 is a partial perspective view of the carousel unit with some of the panels removed to expose the carousel drive assembly.
Figure 29:
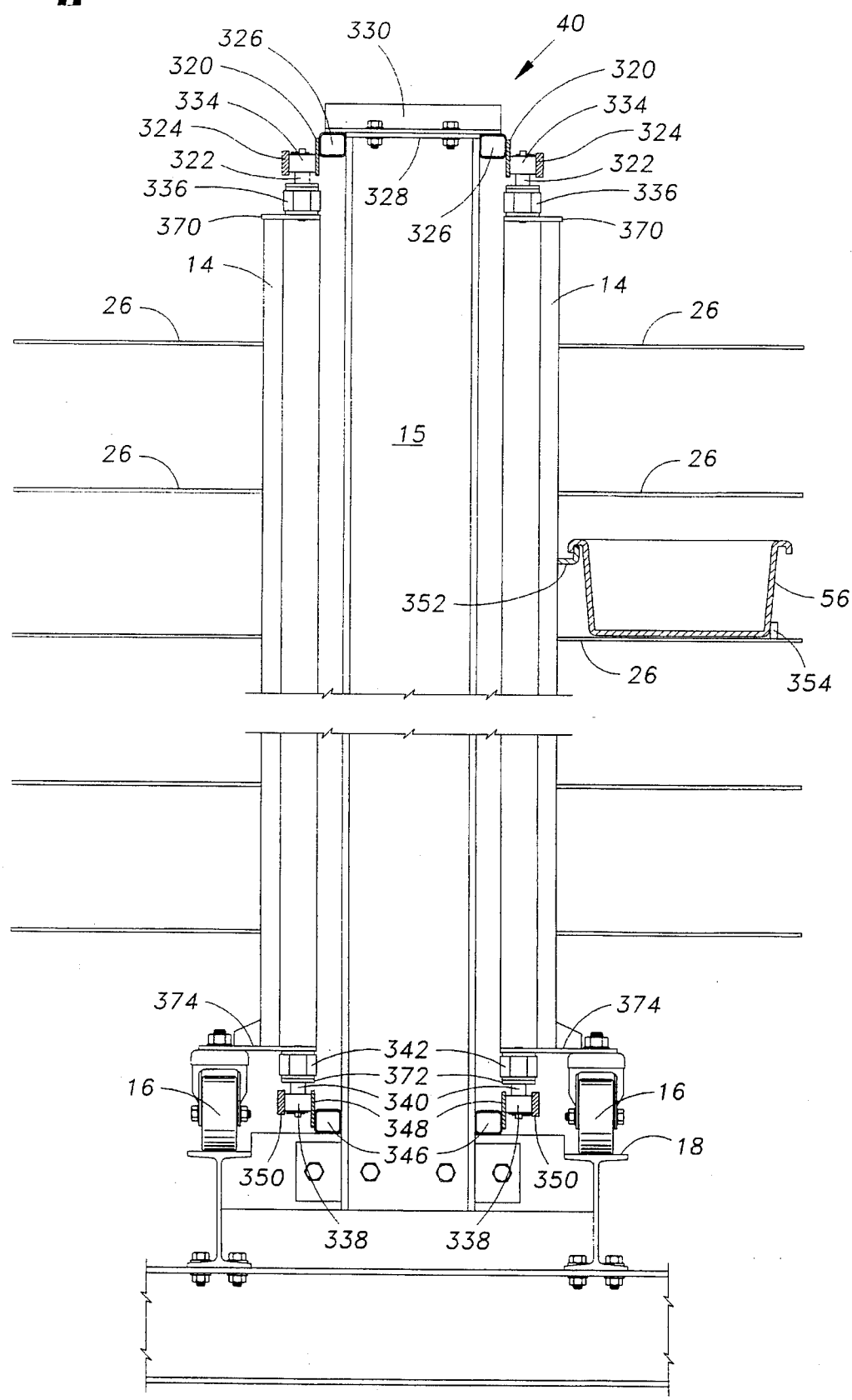
FIG. 29 is a cross-sectional elevational view of the storage carousel unit illustrating particularly the support mechanism.
Figure 30:
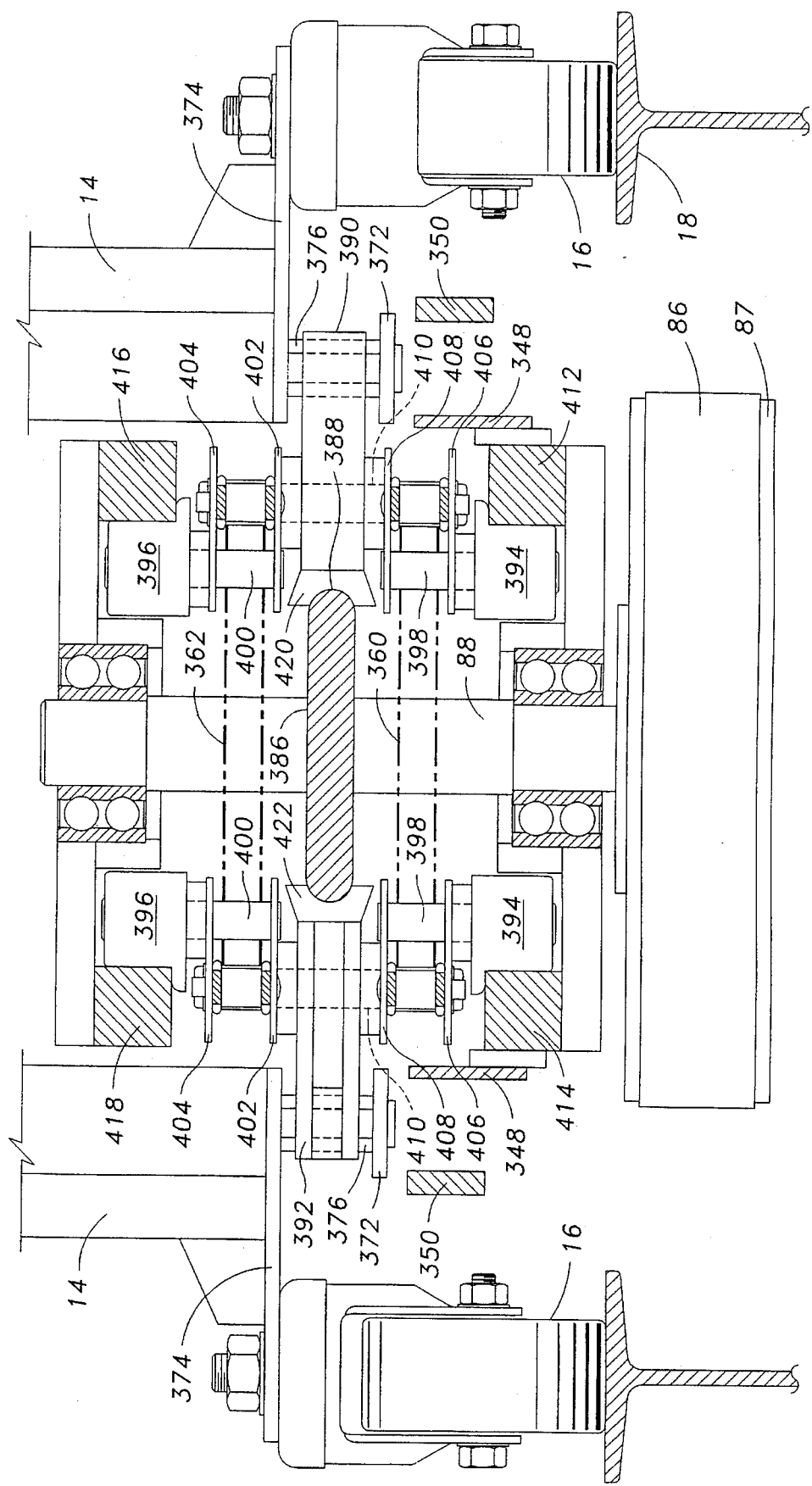
FIG. 30 is a cross-sectional view of the lower end of the carousel unit at the location of the carousel drive assembly.
Figure 31:
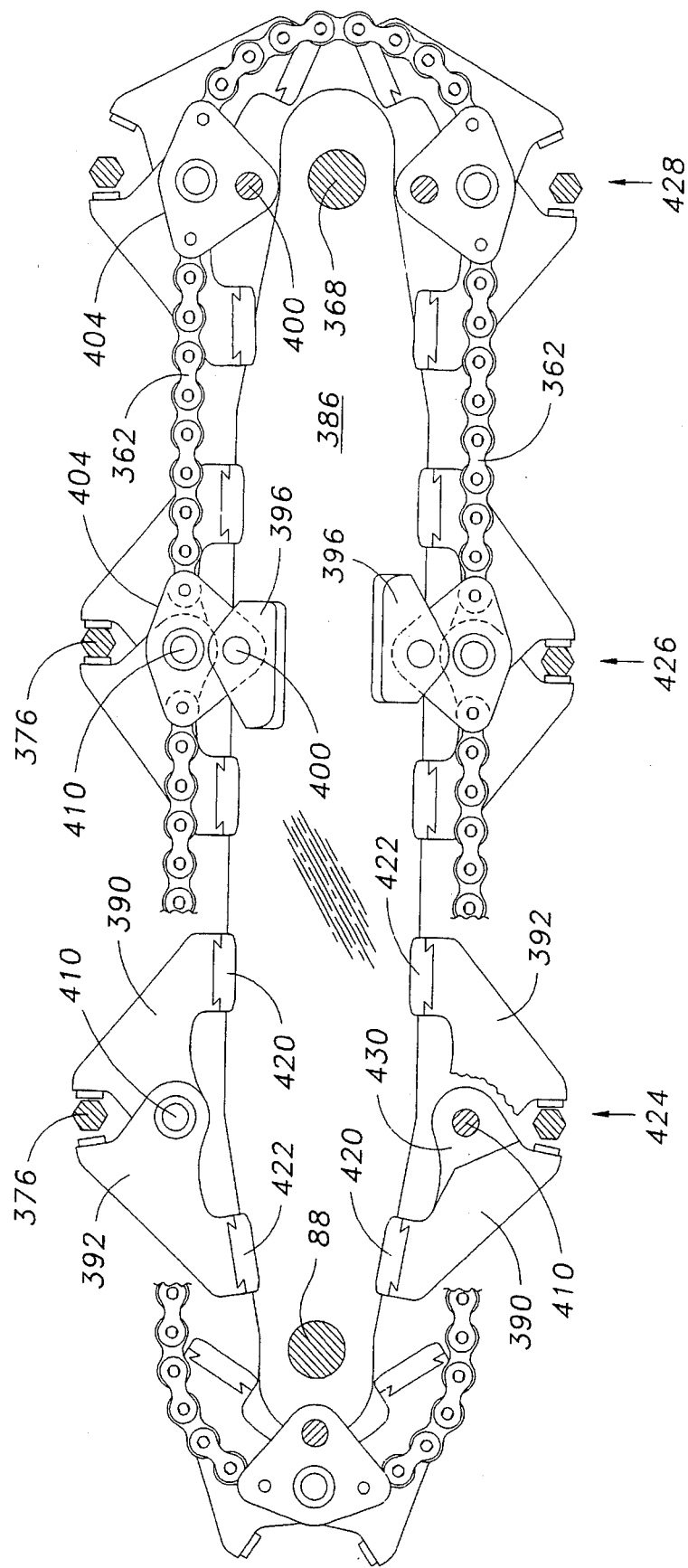
FIG. 31 is a simplified partially broken plan view of the carousel drive assembly.

For a more detailed understanding of the mechanically interlocked drive chain for the carousel and shuttle units attention is invited, for example, to FIGS. 9, 10, 11 and 12 where the drive assembly is illustrated in simplified diagrammatic form for ease of illustration. Drive shaft 76 is actuated by any suitable drive means such as a conventional electrical motor 77 (FIG. 28). Toothed belt pulley 78 is affixed to shaft 76 and drives toothed belt 80. Toothed belt 80 drives second pulley 82 which is affixed to shuttle drive shaft 90. Third pulley 84 is affixed to shuttle drive shaft 90 and serves to drive second toothed belt 86. Second toothed belt 86 drives fourth toothed pulley 87 which in turn drives carousel drive shaft 88. Shuttle drive shaft 90 also drives generally circular cam disc or crank disc 92.

Cam disc 92 has a cam surface 94 at its outer periphery. The input and output track bars 74 and 75 are actuated through mechanical linkages by means of the action of cam followers 96 and 98 moving over cam surface 94. Cam surface 94 drives cam followers 96 and 98 to raise and lower track bars 74 and 75 through the action of cam levers 100 and 102 and connector rods 112 and 114. Cam levers 100 and 102 are mounted to fixed pivot points 104 and 106, respectively, on stationary brackets. Floating pivot points 108 and 110 connect cam levers 100 and 102 with connecting rods 112 and 114, respectively. Acting through bar pivot points 116 and 118, connecting rods 112 and 114 drive track bars 74 and 75 linearly. Track bars 74 and 75 are anchored to fixed support members by means of track bar links 120 and 122, respectively. By reason of this linkage the linear movement of track bars 74 and 75 causes them to rise and descend carrying the free running vertical drive members 60 and 58 with them. The rotation of cam disc 92, acting through this linkage, thus causes the actuation of the vertical drive members. The profile of this cam surface 94 is such that the cam riser extends for approximately 180 degrees. The cam followers 96 and 98 are located about 180 degrees apart so that as cam disc 92 rotates one cam follower enters onto the cam rise while the other is coming off of it. While input track bar 74 is in its uppermost position output track bar 75 is in its lowest, and vice versa. The shuttle input and output forks, 36 and 38, are thus caused to follow the input and output paths, 50 and 52, respectively. Since the shuttles move back and forth the free running vertical drive members 58 and 60 are provided with cam followers or wheels 62 and 64, respectively, which travel over the upper flat surfaces of track bars 74 and 75. The flat upper surface 72 of track bar 75 is typical.

Cam disc 92 acts as a crank disc insofar as the drive chain for the shuttle units is concerned. A crank pin 124 on crank disc 92 is pivotally connected to a drive rod 126 which is in turn pivotally connected through floating pivotal connection 128 to shuttle drive rod 130. Shuttle drive rod 130 is connected to output shuttle frame 43 through universal joint 132. The shuttle unit moves along a reciprocal linear path so a shuttle drive link 134 is provided to accommodate the resulting axial motion of shuttle drive rod 130. Shuttle drive link 134 is mounted to a stationary bracket through fixed pivot point 136, and to rod 130 through floating pivot point 138. Crank disc 92 drives both shuttle units 30 and 32 through shuttle drive rod 130.

Figure 12:
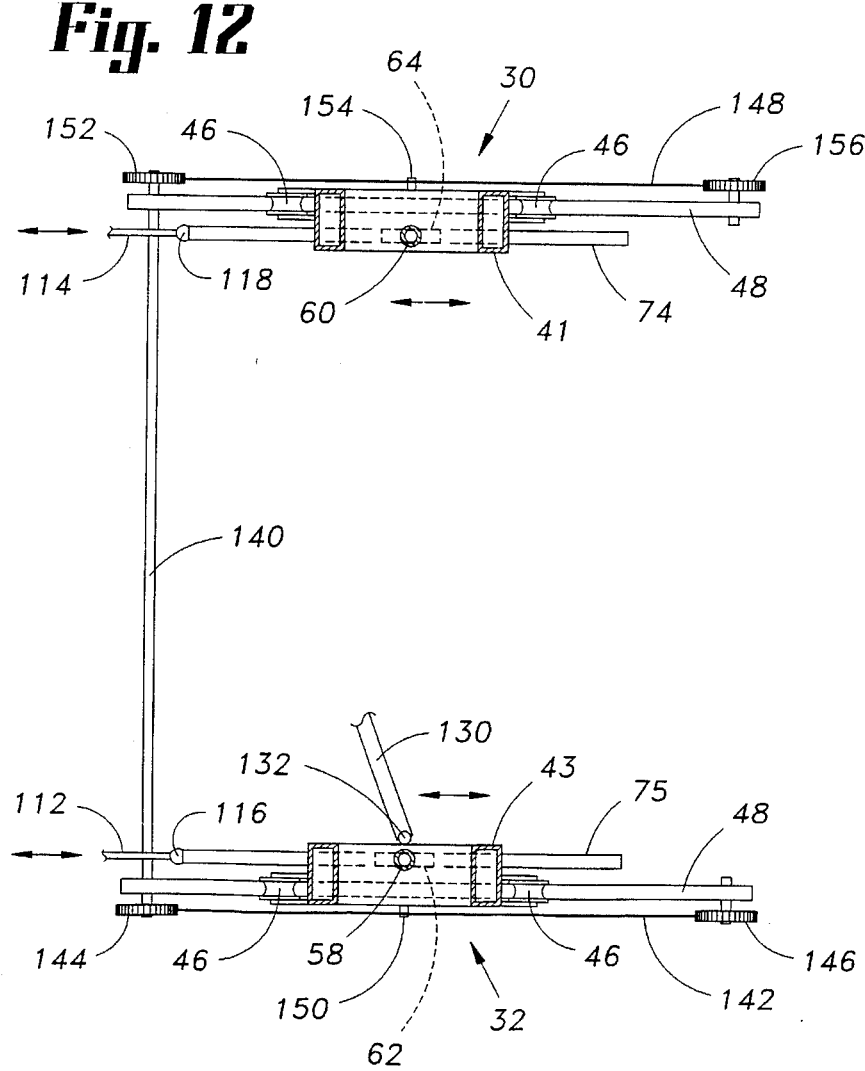
FIG. 12 is simplified plan view of the lower shuttle synchronization mechanism.

In addition to the overhead structural linkage through frame 42, preferably, the shuttle units 30 and 32 are also linked at the bottom, for example, by a drive shaft and associated roller chains as illustrated particularly in FIG. 12. The interconnecting shuttle drive shaft 140 extends between the lower parts of shuttles 30 and 32. One reach of shuttle drive chain 142 is attached to a shuttle bracket 150 so that shuttle drive chain 142 is slaved to the movement of shuttle 32. The movement of shuttle unit 32 causes shuttle drive chain 142 to move, carrying with it sprocket 144 which in turn drives interconnecting drive shaft 140 and sprocket 152. Sprocket 152 drives shuttle driven chain 148. One reach of chain 148 is attached to bracket 154 which is mounted on shuttle unit 30. The movement of chain 148 carries shuttle unit 30 with it. This system of chains and sprockets serves primarily to keep the shuttle units from moving independently of one another for slight distances as might be encountered, for example, in an undesired oscillation. Idler sprockets 146 and 156 merely serve to support chains 142 and 148 in operative position.

The vertical lift unit 28 consists of a vertical lift unit frame 198 within which is mounted lift drive assembly 168. Lift fork carriages 158 are moveably mounted to frame 198. Lift fork assemblies 186 are mounted to lift fork carriages 158. Lift drive assembly 168 is mounted in one fixed location within frame 198 and serves to drive, by positive mechanical engagement with lift drive bars 166, the endless link belt which is defined by the interlinked lift fork carriages 158. See, for example, FIGS. 13 through 24.

Lift unit frame 198 consists, for example, of four normally vertically extending channel members 204, cross members 206, and spacer members 208. See, for example, FIGS. 21, 22 and 23. Channel members 204 and cross members 206 are normally permanently secured together, as, for example, by welding, to form a ladder like structure where the rails are defined by channel members 204 and the steps by cross members 206. Two of these ladder like structures are secured together in a normally vertical, spaced, parallel arrangement by means of spacer members 208. Spacer members 208 are set in from one face of the resulting generally rectangular structure and secured to the cross members 206 so as to provide space for the lift fork carriages 158 to travel generally vertically along two opposed faces of frame 198 within channel members 204. A lift motor 210 is conveniently mounted to one of the other opposed faces of the frame 198. Lift motor 210 serves to drive lift drive assembly 168 through lift drive shaft 212.

Channel members 204 are preferably generally U-shaped in cross section. The open sides of Channel members 204 in frame 198 are disposed so as to open towards one another. The lift carriage rollers or cam followers 202 are intended to be received within channel members 204 for rolling contact with one of the inside surfaces of the legs of the U-shaped channel member. Wear blocks 214 run the length of channel members 204 in close proximity to the axial ends of rollers 202 and serve to prevent axial movement of lift drive bar 166. Wear blocks 214 may preferably be made of some material which has a low coefficient of friction. At the normally upper and lower ends of frame 198, upper and lower lift guides 216 and 218, respectively are provided to guide the lift fork carriages 158 laterally as they transition between the ascending and descending reaches of the vertical lift unit 28. The link belt which is formed by the linking together of the lift fork carriages 158 is free to expand or contract at the ends where they transition between the ascending and descending reaches of the vertical lift unit.

Figure 18:
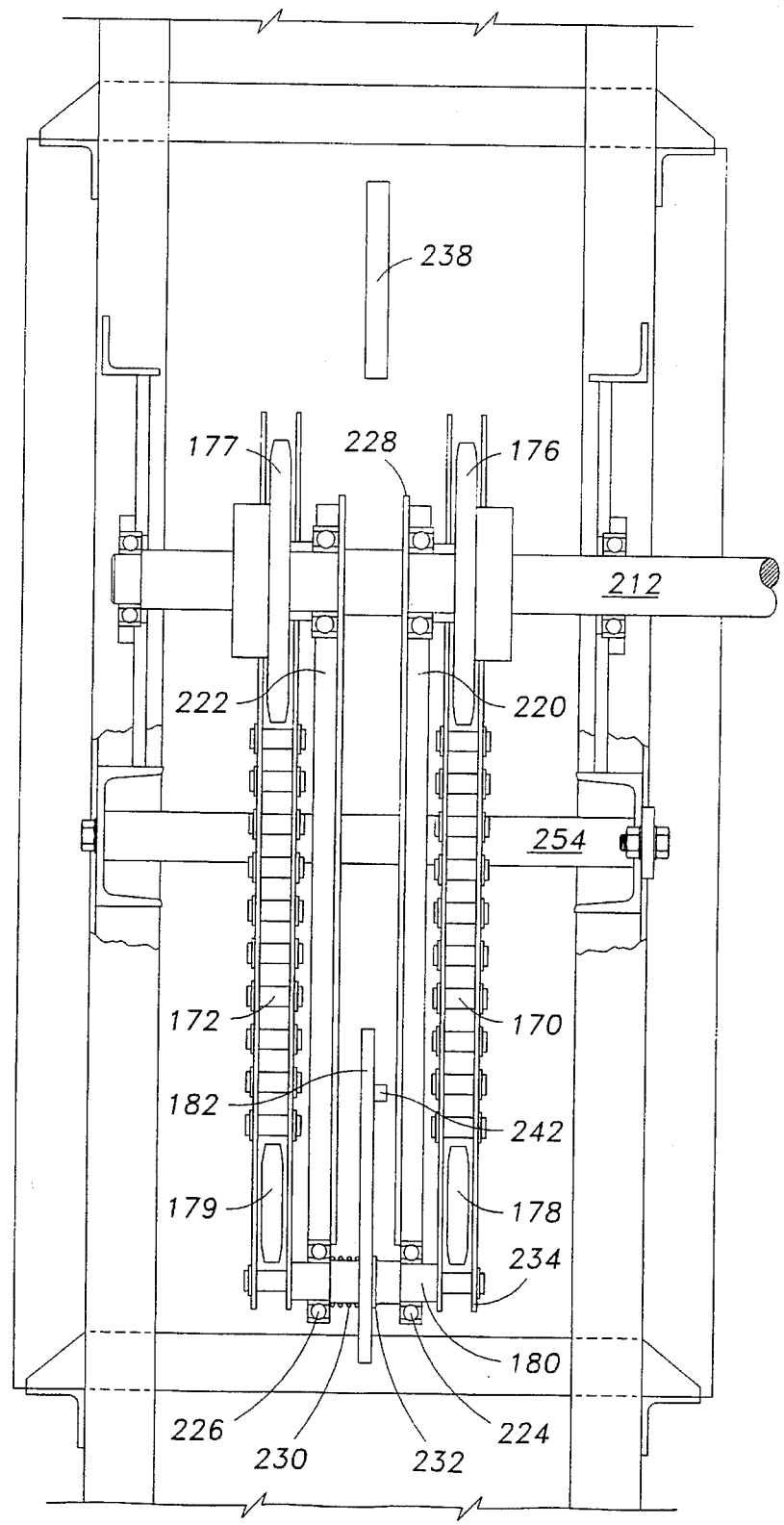
FIG. 18 is a simplified front elevational view of the lift drive assembly.
Figure 19:
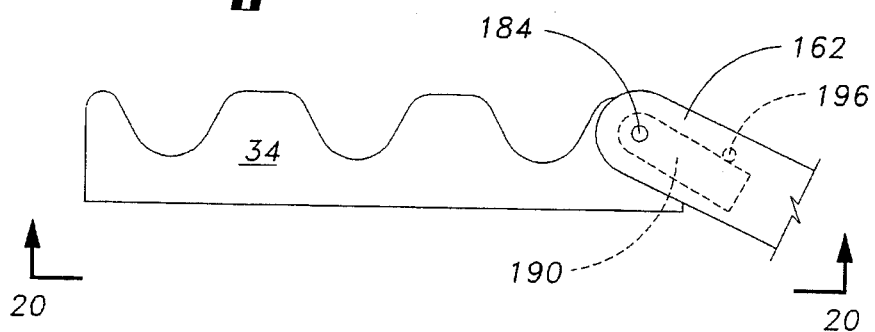
FIG. 19 is a partial plan view of a lift fork.
Figure 20:
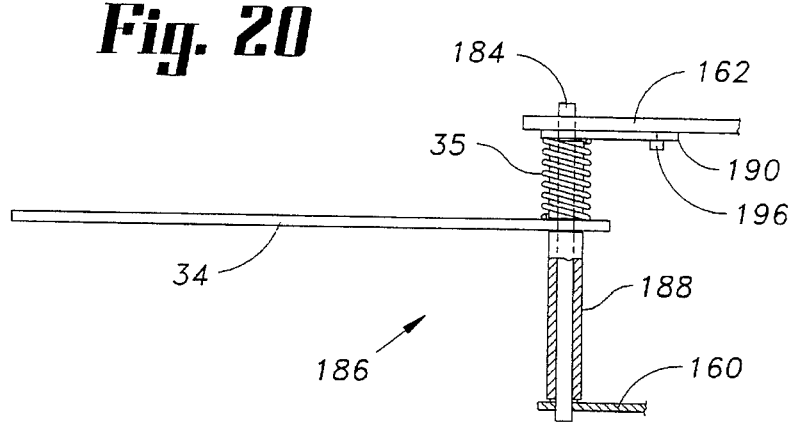
FIG. 20 is a side elevational view of the lift fork of FIG. 19.

The vertical lift unit 28 is preferably driven independently of the rest of the system by a lift drive system or assembly which is indicated, for example, at 168. Lift drive assembly 168 is preferably located between the ascending and descending reaches of vertical lift 28 and comprises a pair of lift drive chains 170 and 172 trained around lift drive sprockets 176 and 177, and lift idler sprockets 178 and 179. In FIG. 18, for purposes of clarity, the drive chains 170 and 172 have been indicated but not fully illustrated in the area of the sprockets, and the idler shaft upon which the idler sprockets 178 and 179 are mounted is not illustrated. Lift drive sprockets 176 and 177 are keyed to and driven by lift drive shaft 212. Lift drive shaft 212 is driven by lift motor 210. Shafts 180 extend laterally between and are carried by the lift drive chains 170 and 172 around an endless loop. Each shaft 180 carries a lift pawl 182 which is journaled on shaft 180. Each pair of lift forks 34 is mounted on a lift fork carriage 158. Lift fork carriages 158 are adapted to be driven generally vertically by temporary engagement between drive bars 166, which are a part of the lift fork carriage, and lift pawls or dogs 182 which are a part of drive assembly 168. See, for example, FIGS. 13 through 18, and 21.

The path along which the shafts 180 are carried by lift drive chains 170 and 172 is defined by the peripheral surfaces of lift cam plates 220 and 222. Each of the shafts 180 carries a pair of lift cam followers or rollers 224 and 226. These lift cam followers 224 and 226 ride on the peripheral surfaces of lift cam plates 220 and 222, respectively, as they are carried along by the action of lift drive chains 170 and 172 on shafts 180. Flanges are conveniently provided on lift cam plates 220 and 222, as illustrated, for example, at 228. Flange 228 serves to prevent lateral movement of the lift cam followers. Lift pawls 182 are journaled for pivotal movement on shafts 180, and are spring biased by pawl spring 230 into engagement with pawl flange 232 on shaft 180. This permits pawls 182 to move slightly in a lateral direction, as may be necessary.

Shafts 180 are mounted to the lift drive chains 170 and 172 through link plates shown for example at 234. Link plates 234 are inserted into the lift drive chains where they serve as links in the chains and to journal the ends of shafts 180. The link plates 234 are longer than the normal links of the lift drive chains 170 and 172 so lift drive sprockets 176 and 177 are specially configured with wide teeth 234 and 236 and with any other special tooth profiles which may be necessary to accommodate this extra length and the shafts 180. See, for example, FIG. 24. Lift idler sprockets 178 and 179 may conveniently be in the form of rollers rather than toothed sprockets, if desired, so as to avoid the use of special sprocket configurations.

As a lift pawl 182 travels upwardly it engages a drive bar 166 and carries it in a normally upwardly direction. See, for example, FIG. 17. Between its engagement with shaft 180 and drive bar 166 the lift pawl 182 is held in operative position as it travels upwardly. When it nears the top of its travel and lift cam follower 224, for example, starts onto the normally upper semicircular periphery of lift cam plate 220, lift pawl 182 disengages with drive bar 166 which continues to move upwardly. Lift pawl 182 is guided around an arc which brings it into position to engage with a drive bar 166 which is on the descending side of vertical lift unit 28. Such guiding is conveniently provided by means of a plate 238 with an arcuate pawl guide slot 240 therein. Pawl guide rollers 242 are mounted on lift pawls 182. As Lift pawls 182 disengage with drive bars 166 near the upper end of the lift pawls' travel the pawl guide rollers 242 enter slot 240. As lift pawls 182 reach the descending side of the vertical lift unit 28 they engage with a descending drive bar 166 and leave pawl guide slot 240. The engagement between slot 240 and rollers 242 keeps the pawls properly positioned to engage the descending drive bars. While engaged with the drive bars on the descending reach of the vertical lift the pawls are held in the proper operative position by the cooperation between the drive bars 166 and the shafts 180. As the lift pawls 180 approach the end of their downward travel they disengage from the drive bars 166. The drive bars 166 continue on down the descending reach of vertical lift 28 and the pawls begin the transition to the ascending reach of lift 28. The pawls are carried by shafts 180 along a generally downwardly and inwardly directed path which is defined by the peripheries of lift cam plates 220 and 222. As the pawls 182 disengage from the drive bars 166 they contact descending pawl guide pin 244 which serves to hold the pawls in the position shown, for example, in FIG. 17. As the pawls move to the position where they begin their upward travel they contact ascending pawl guide pins 246 and 248 which serve to force the pawls into a position where they engage with the drive bars 166 on the ascending reach of lift 28. The action of the ascending pawl guides on the tail portion 250 of pawl 182 causes the nose portion 252 of pawl 182 to swing into contact with an ascending drive bar 166. As a pawl is guided upwardly it moves into full engagement with the drive bar and carries the associated lift carriage upwardly. Because the lift carriages are linked together through spherical bearings 200 this serves to drive all of the lift carriages on both the ascending and descending reaches of lift 28. Although there may be as many as 10 or 20 lift carriages 158 on the ascending reach of lift 28 it is only necessary to drive two or three of them at one time. Thus, the lift drive assembly 168 preferably extends for only a fraction of the height of the vertical lift 28.

The lift drive assembly 168 is preferably supported within frame 198 by means, for example, of lift drive shaft 212 and support shaft 254. Lift drive motor 210 is adapted to drive lift drive assembly 168 quickly, precisely and intermittently. Thus, while storage carousel 12 is moving the width of one rack 14 motor 210 may drive lift drive assembly 168 to move forks 34 through a distance equal to the length of several lift fork carriages, stop it at a predetermined location, and then move it again through the length of several lift fork carriages and stop it at a second predetermined location.

Lift fork carriages 158 include first lift shelf supports 160 and second lift shelf supports 162. Lift shelf supports 160 and 162 project outwardly and in generally parallel relation to one another from a generally rectangular frame composed of normally vertical stays 164, drive bar 166 and the base of shelf support 162. First lift fork supports 160 are preferably welded to lift drive bar 166. The respective lift fork carriages 158 are coupled or chained together by lift links 174 which are rigidly mounted to the stays 164 and are journaled, preferably by spherical bearings, on drive bar 166. The lift fork carriages are chained together so that they form an endless loop in the form of a lift link belt. Preferably the only articulation in this lift link belt system is at the drive bars 166. See, for example, FIGS. 14, 15 and 16.

The lift forks 34 are part of a lift fork assembly indicated generally at 186. See, for example, FIGS. 19 and 20. The lift fork assembly includes lift forks 34, axially hollow lift fork shafts 188, lift fork pivot pins 184, lift fork springs 35 and lift fork stop arm 190. Lift fork shafts 188 extend unbroken for the full distance between lift shelf supports 160 and 162 and are, for example, journaled on Lift fork pivot pins 184. Alternatively, pivot pins 184 may be integral with lift fork shaft 188. Lift forks 34 are affixed to and project generally normally from lift fork shafts 188 intermediate the ends thereof. The first and second lift shelf supports 160 and 162 are spaced apart by a distance about equal to the length of lift fork shafts 188 and are provided with bores 192 and 194, respectively, adjacent their free ends. Bores 192 and 194 are aligned so as to receive lift fork pivot pins 184, for example, in journaled relationship, whereby forks 34 are free to pivot between the operative position which they occupy on the ascending and descending reaches of the vertical lift unit 28 and the split position which they occupy as they transition between those reaches. See, for example, FIGS. 7 and 8. Springs 35 serve to bias forks 34 into the generally parallel relationship shown, for example, in FIG. 7. The lift fork stops 196 on, for example, second lift shelf supports 160, in cooperation with lift fork stop arm 190, limit the travel of forks 34 so that they are not biased past the desired parallel position by the action of springs 35. Since the link belt which is defined by the interlinked lift fork carriages 158 only runs in one direction, one side of the forks 34 serves to support containers in the input reach and the opposite sides of forks 34 serve to support containers in the output reach. If there is sufficient space to permit the forks 34 to pass between the ascending and descending reaches of the vertical lift 28 without being pivoted to a low profile configuration then the forks 34 can be welded to the lift fork carriages 158.

The axially opposed ends of drive bar 166 serve to link lift fork carriages 158 together through lift links 174. Spherical bearings, 200, for example, are journaled on drive bar 166 and mounted in lift links 174. Lift carriage rollers 202 are mounted on the opposed outer ends of drive bars 166, either on short shafts which are socketed in the opposed outer ends of drive bar 166 as shown, for example, in FIGS. 14, 15 and 21, or on reduced ends of drive bars 166.

The lowest level 70 of lift 28 is provided with suitable mechanism for inserting and removing containers. A preferred embodiment of such insertion and extraction mechanisms is illustrated, for example, in FIGS. 25a, 25b, 26 and 27. In the embodiment illustrated, both insertion and extraction are accomplished by means of several driven rollers which are positioned to intermesh with lift forks 34 and engage the bottom surfaces of containers at the transfer level 70. Under the urging of frictional engagement with these rollers the containers are driven laterally onto or off of the vertical lift. On the input side the forks 34 come from underneath the driven rollers and engage containers after they have been moved into position by the driven rollers. On the output side of vertical lift 28 the containers are carried downwardly by the forks 34 until they engage the driven rollers. The forks continue on downwardly and the rollers drive the containers off the vertical lift and onto output conveyor 24.

On the input side of vertical lift 28 a stationary input roller mounting plate 256 supports input rollers 258 and 260 in a cantilevered configuration. Input rollers 258 and 260 project generally in a common plane which is generally normal to plate 256. A container stop 262 projects upwardly for at least two or three inches above the plane of rollers 258 and 260 so as to engage an incoming container and stop it in the proper location relative to forks 34. The system of input rollers on the input side is preferably driven by a conventional electrical motor, not shown. A drive pulley 266 is mounted to input motor shaft 264. Input drive belt 268 serves to drive input pulleys 270 and 272. Input pulleys 270 and 272 are journaled on input rollers 260 and 258, respectively. Input idler pulley 274 tensions input drive belt 268. Input rollers 258 and 260 include a covering of some high friction material such as rubber which engages frictionally with the bottoms of containers as they are delivered to the input side of the vertical lift 28 by conveyor 22. An input shelf 276 may be provided, if desired, to bridge the gap between the end of conveyor 22 and input roller 258, as well as to support the free end of roller 258. Small driven input wheels, typical ones of which are indicated at 278, are positioned within the scolloped areas of forks 34. Wheels 278 are driven by input wheel belts, typical ones of which are indicated at 280. Input wheel belts 280 are generally round in cross-section and are trained around input roller 258 in an area where the covering has been removed from input roller 258. Wheels 278 are thus driven by input roller 258. Wheels 278 are mounted on arms which extend from input shelf 276 in such a position that the belts 280 come into contact with the bottoms of containers in about the same plane as rollers 258 and 260. Containers coming in from conveyor 22 are thus supported and urged laterally onto forks 34 by frictional engagement with belts 280. As the containers move further into position to be carried by forks 34 they frictionally engage roller 260 and finally they come to rest against container stop 262 in the position indicated for container 56. In its final position container 56 rests momentarily on belts 280, roller 260 and input idler wheels 282 before being lifted up by forks 34. Idler wheels 282 are mounted on arms which extend conveniently from container stop 262 and are they not driven. Idler wheels 282 serve to support and help position container 56 for an instant before it is carried upwardly by forks 34. While container 56 is being loaded onto forks 34, the forks remain below the plane which is generally tangent to rollers 258 and 260, belts 280 and wheels 282. Preferably the input rollers and wheels run continuously at a constant speed so that any container which is delivered by conveyor 22 is immediately loaded. Alternatively, the motor which drives input motor shaft 264 may be stopped and started with the same precision as lift drive motor 210. Preferably, a container is not delivered to the input side of vertical lift 28 by conveyor 22 until there is a carousel shelf 26 open which will be in position to receive it when the container arrives at the shelf.

On the output side of vertical lift 28 the driven roller system includes three main rollers, namely, first output roller 284, second output roller 286, and third output roller 288, as well as two sets of driven output wheels, namely, first and second driven output wheels, typical ones of which are indicated at 290 and 292, respectively. The respective driven output wheels 290 and 294 are positioned within the scallops of forks 34 and are driven by first and second output drive belts 296 and 298, respectively. The main rollers 284, 286 and 288 are journaled in and cantilevered generally normal to output roller mounting plate 292. Powered output pulley 300 is fixed to the end of output motor shaft 302 which is driven by a motor, not shown. An output belt 304 is trained around a series of pulleys which drive the output rollers and wheels. First, second and third output pulleys 306, 308 and 310, respectively, drive first, second and third output rollers 284, 286 and 288, respectively. Output drive belts 296 and 298 are trained around and driven by output rollers 284 and 288, respectively. Output rollers 286 and 288 are coated with a material which has a high coefficient of friction so as to promote good frictional engagement between these rollers and the bottoms of containers. An output bridge is provided by output shelf 316 which serves to bridge the gap between the end of output conveyor 24 and vertical lift 28 as well as to support the free end of roller 288. A cantilevered brace 318 is mounted to plate 292 serves to support the free end of roller 284.

As lift forks 34 descend through the plane which is generally defined by the tangent to main output rollers 284, 286 and 288, the bottom of any container which the forks are carrying comes into frictional engagement with the roller 286 and belts 296 and 298. As the forks 34 drop below this plane the container begins to move laterally off of the lift responsive to the action of the roller and belts. After moving a short distance the bottom of the container comes into frictional engagement with roller 288 which further aids in discharging it from vertical lift 28. Preferably the output rollers are driven continuously at a constant speed, but, as with the input rollers, they may be operated intermittently upon demand.

The racks 14 of storage carousel unit 12 are guided laterally along their endless path over track 18 by means of rollers on the racks engaged in open channels on the supporting frame. The vertical loads on the racks 14 are carried by wheels 16. The guiding structure is substantially the same at both the normally upper and lower edges of the racks. See, for example, FIGS. 7, 8, 28, 29 and 30. In FIG. 28 several of the panels 14 have been removed to permit the structure, particularly the carousel drive assembly 54, to be viewed. Overhead beam 40 is composed of hollow box beams 326, top brace 328 and top stiffener 330. The carousel guiding structure at the upper edge of carousel 12 includes an open channel on each side of overhead beam 40. The open channels are defined by inner and outer upper guide plates 320 and 324, respectively, which are affixed to hollow box beams 326. The brackets which mount outer upper guide plates 324 to box beams 326 are not shown but they are similar to those shown at 332 which mount the lower outer guide plates to the lower beams. See, for example, FIG. 28. Box beams 326 are affixed to pedestal 15 and top stiffener 330. In general, the open channels which are defined by inner and outer upper guide plates 320 and 324 run in straight lines for the length of the carousel unit but do not extend around the ends of the track 18 where the racks 14 turn between the approaching and departing reaches. The movement of the carousel at these turning locations is confined only by the linkages between the racks 14 so that room is provided to accommodate changes in the length of the carousel which occurs, for example, by reason of changes in temperature. The upper carousel guide rollers 334 ride in the channels formed by guide plates 320 and 324. The same hinge bolts 322 upon which rollers 334 are mounted extend on down through upper rack links 336. Hinge bolts 322 are journaled in spherical bearings, not shown, in upper rack links 336. Upper rack links 336 are affixed to panels or racks 14 through top plates 370. Top plates 370 are affixed, for example, by weldments to the top edges of racks 14. Lower carousel guide rollers 338 are similarly mounted on hinge bolts 340 which are journaled in spherical bearings 344 in lower rack links 342.

Figure 32:
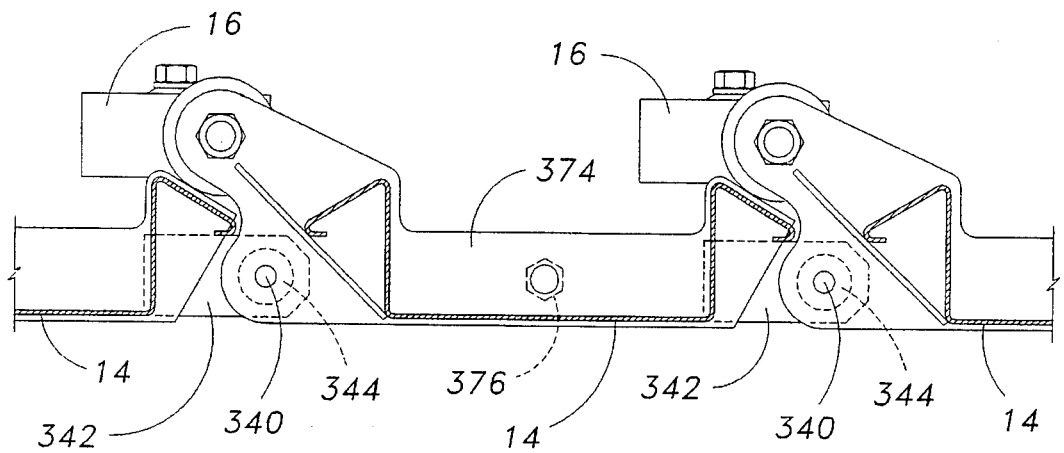
FIG. 32 is a partial cross-sectional plan view of the carousel panels and associated hinge and caster structure.
Figure 33:
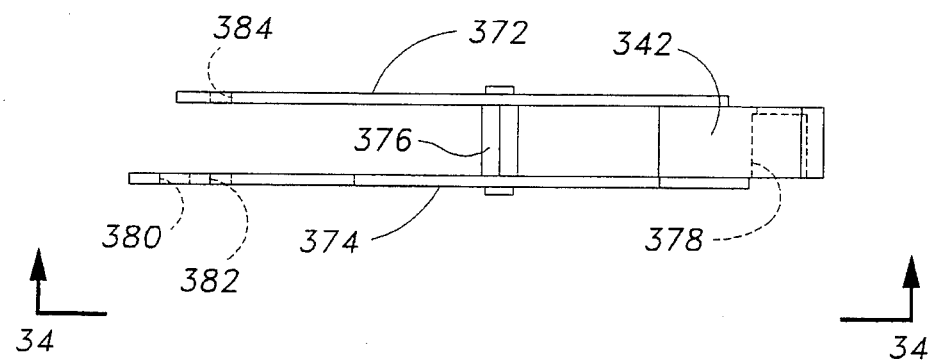
FIG. 33 is a side elevational view of the lower mounting plates for the storage carousel panels.
Figure 34:
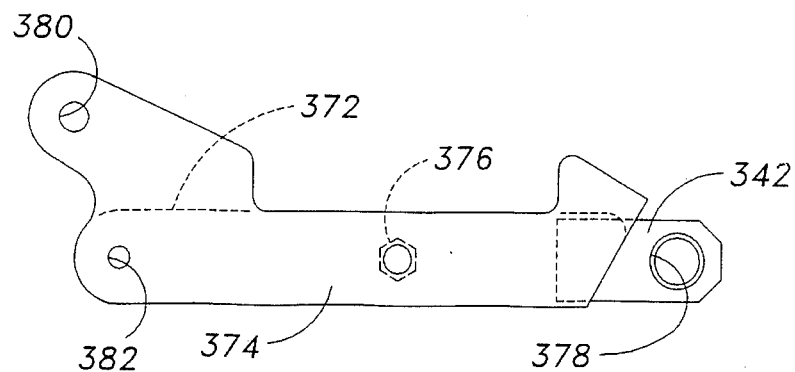
FIG. 34 is a plan view of the lower mounting plates of FIG. 33.

Lower rack links 342 are affixed to the racks 14 through bottom plate 372 and caster mounting plate 374. See, for example, FIGS. 29, 32, 33 and 34. Caster mounting plate 374 is welded directly to the bottom of rack or panel 14. Bottom plate 372 is welded to lower rack links 342 and to hexagonal drive studs, typical ones of which are illustrated at 376. Studs 376 are the structural elements which are engaged by carousel drive assembly 54 to move the carousel 12 along track 18, as will be described in greater detail hereinbelow. Lower rack links 342 and hexagonal drive studs 376 are in turn welded to caster mounting plate 374 so that bottom plates 372, caster mounting plates 374, lower rack links 342 and hexagonal drive studs 376 form one integral unit. Pockets 378 in lower links 342 are adapted to receive spherical bearing 344. Caster bore 380 in caster mounting plate 374 serves to mount the caster assembly which carries wheels 16. Top hinge bolt bore 382 in caster mounting plate 374 is axially aligned with bottom hinge bolt bore 384 in bottom plate 372. Caster mounting plate 374 and bottom plate 372 are spaced apart at the location of bores 382 and 384 so as to receive therebetween link 342 from an adjacent rack. Hinge bolt 340 extends through bore 382, spherical bearing 344, and through bore 384. The hinge bolts 322 and 340 are axially aligned so that rack 14 is hinged on these bolts. Each rack is hinged at its leading and trailing edges directly to the adjacent racks as shown, for example, in FIGS. 7 and 32. There is no other significant flexibility in storage carousel 12. The top plates 370 are substantially identical to bottom plates 372.

The lower box beams 346, and lower inner and outer guide plates 348 and 350, respectively, serve similar functions to their upper counterparts as described hereinabove. Guide plates 348 and 350 run in straight lines for the length of the storage carousel but do not extend around the ends where the racks turn between the approaching and departing reaches. Guide plate mounting brackets 332 serve to hold lower outer guide plates 350 in place. In the region of the carousel drive assembly 54 the box beams are replaced by solid square bars which have sufficient strength to support the drive assembly.

If desired, a measure of earthquake protection may be provided by mounting hooks 352 on panels 14 and using containers 56 which have rims that are in position to engage with hooks 352 as containers 56 are lowered into position on carousel shelves 26 by input shuttle forks 36. See, for example, FIG. 29. Hooks 352 are of such a length that they disengage from the lip of container 56 when the container is lifted from carousel shelf 26 by output forks 38. Additional earthquake protection may be provided, for example by providing stops 354 on shelves 26 closely adjacent to the normally outer bottom edge of container 56. See, for example, FIGS. 8 and 29.

The carousel unit 12 is driven through the same power train that drives the shuttle units 30 and 32. With reference, for example, to FIGS. 9, 28, 30, 31 and 33, drive shaft 76, acting through pulleys 78, 82 and 84 and belts 80 and 86 drives fourth pulley 87. Fourth pulley 87 is affixed to carousel drive shaft 88. Driven carousel sprockets 356 and 358 are affixed to carousel drive shaft 88. Carousel sprockets 356 and 358 drive carousel drive chains 360 and 362, respectively. Carousel drive chains 360 and 362 are trained around carousel drive idler sprockets 364 and 366, respectively. Idler sprockets 364 and 366 are affixed to carousel drive idler shaft 368. Carousel drive chains 360 and 362 cooperate to carry carousel drive jaws, typical ones of which are shown at 390 and 392. Jaws 390 and 392 are adapted to firmly grasp between them individual drive studs 376, and move those studs for a distance before releasing them, thus causing storage carousel 12 to move over track 18. Stabilizing blocks, typical ones of which are illustrated at 394 and 396, are mounted to and carried by drive chains 360 and 362, respectively.

Figure 24:
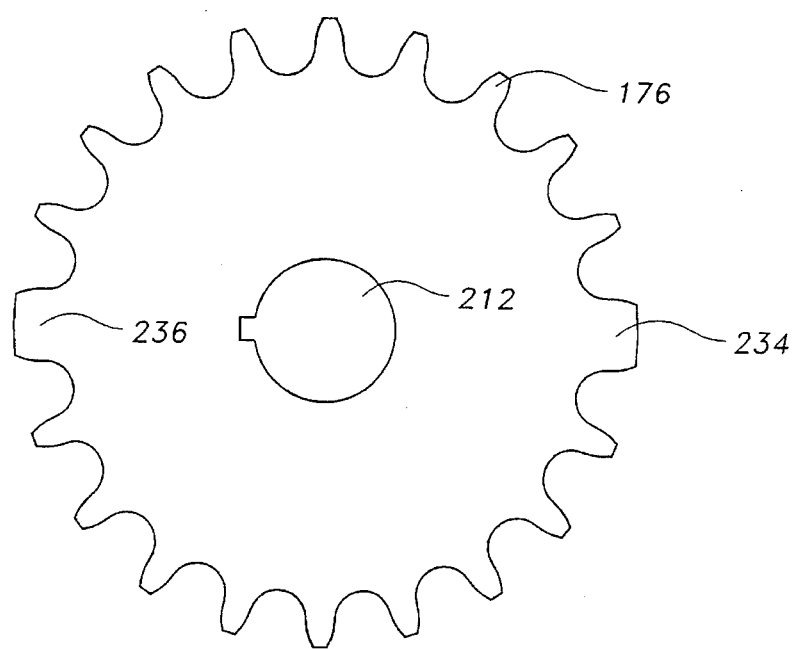
FIG. 24 is a plan view of the vertical lift drive sprocket.
Figure 21:
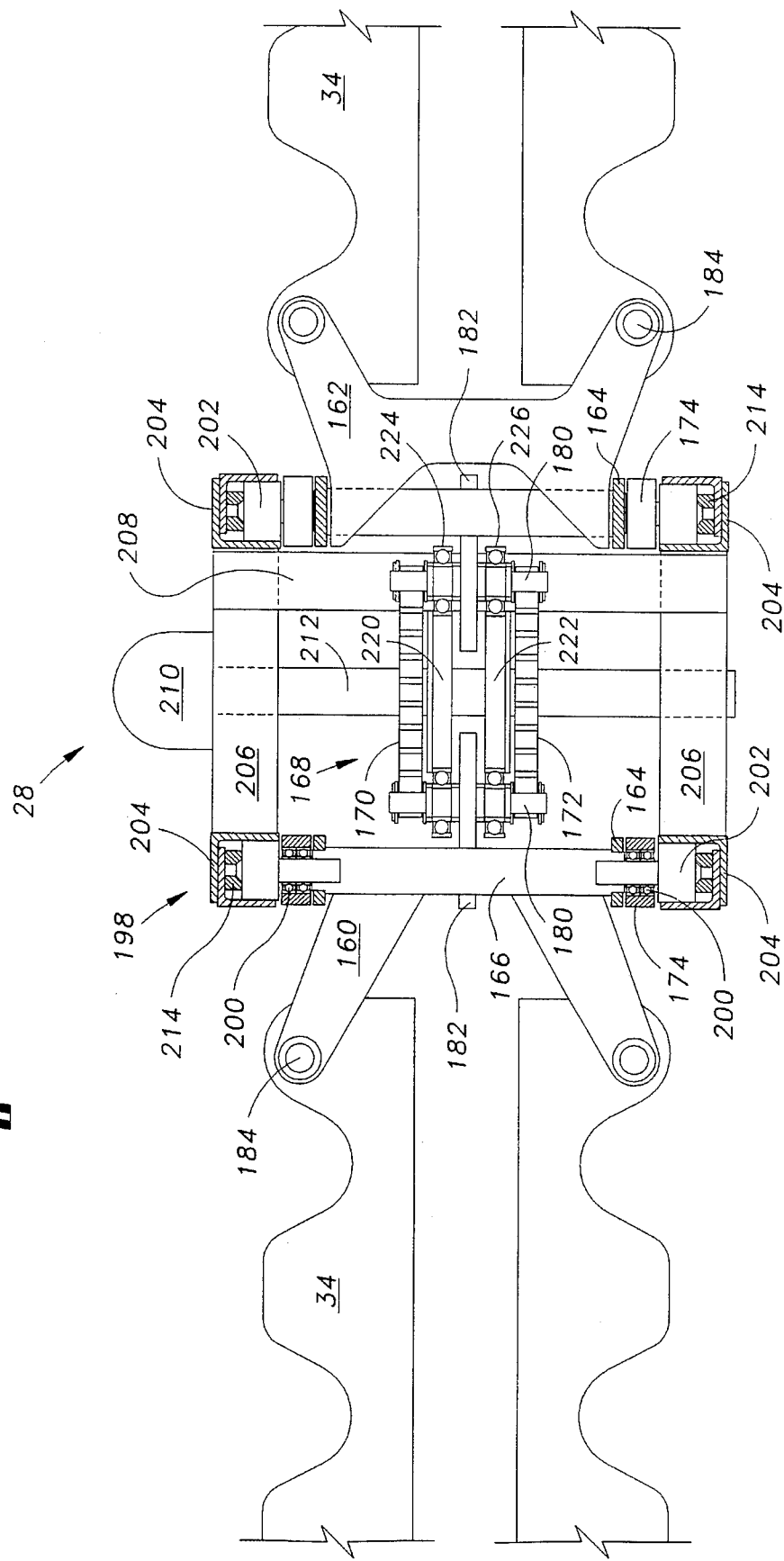
FIG. 21 is a cross-sectional view taken looking downwardly in the normally horizontal plane through the vertical lift unit at a location above the lift drive assembly.
Figure 25A:
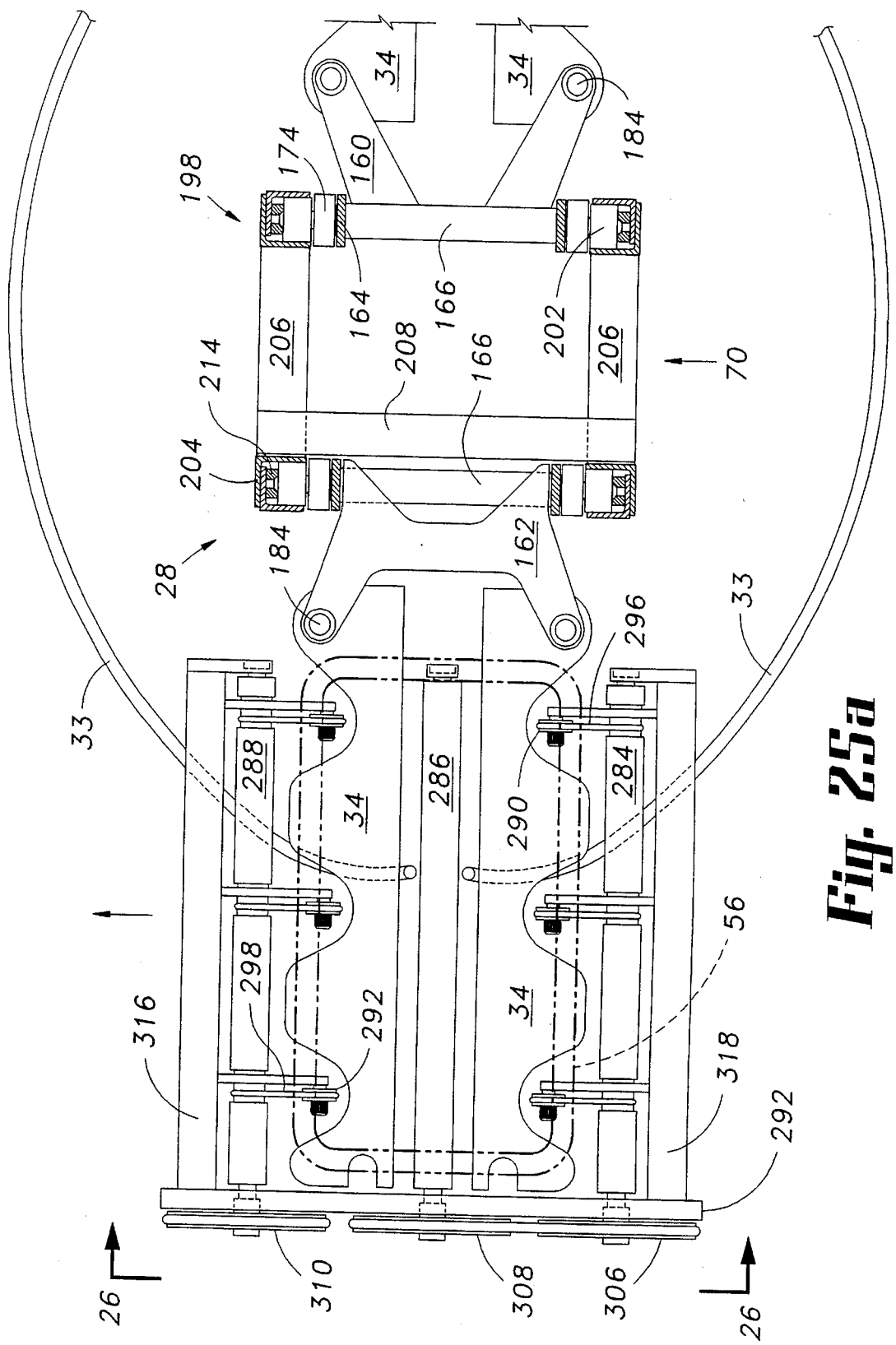
FIG. 25a is a plan view of the output side of the vertical lift at the lowest level.
Figure 25B:
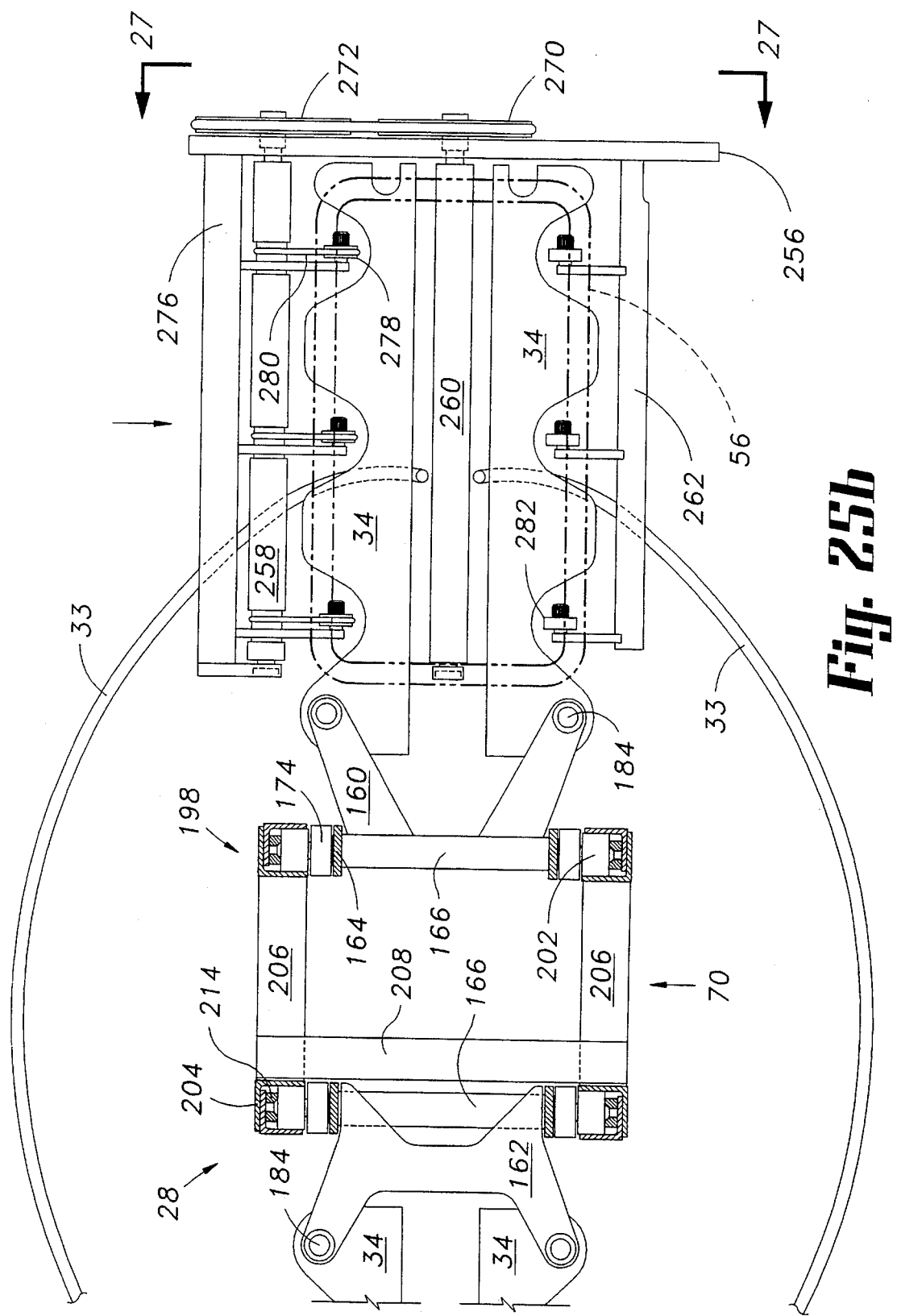
FIG. 25b is a plan view of the input side of the vertical lift at the lowest level.
Figure 26:
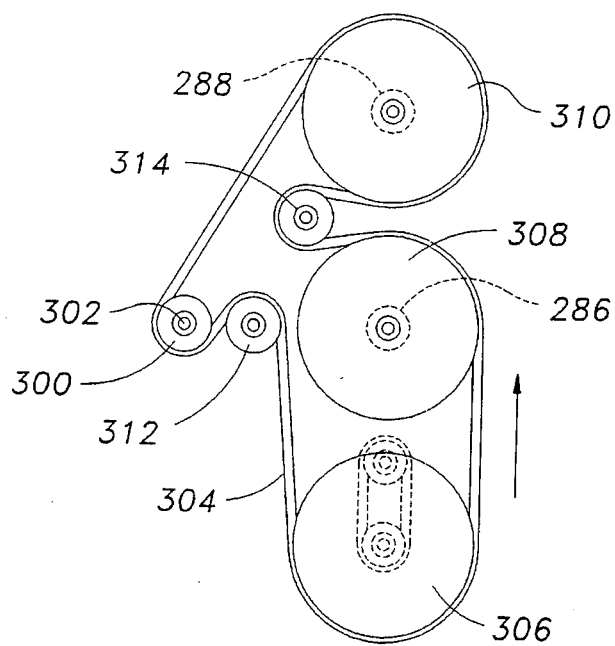
Figure 27:
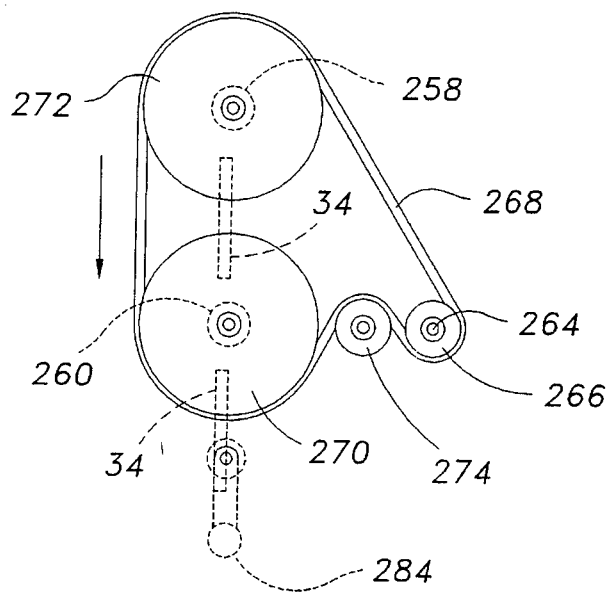
FIG. 27 is a simplified view of the insertion drive chain for the input side of the vertical lift taken along line 27 in FIG. 25b.

The mechanism which is provided to actuate jaws 390 and 392, and hold them in operative position includes, for example, in addition to the drive chains 360 and 362, a carousel drive cam plate 386 with a carousel drive cam surface 388, and stabilizing blocks 394 and 396. Stabilizing blocks 394 and 396 are mounted to stub shafts, typical ones of which are illustrated at 398 and 400, which are mounted to drive chains 360 and 362 through triangular mounting plates, typical ones of which are indicated at 402, 404, 406 and 408. The drive chains are sandwiched between the triangular mounting plates. Jaws 390 and 392 are pivotally mounted on jaw pivot shafts, typical examples of which are illustrated at 410. Shafts 410 extend through all of the triangular mounting plates, both drive chains and both jaws. The jaws are pivotally mounted to shafts 410 at a location about midway between the drive chains 360 and 362. Because of the presence of shafts 410 in the chain links the sprockets 358, 366, 356 and 364 have tooth forms similar to that which is shown in FIG. 24, as may be necessary to accommodate the added length of the chain link and the presence of shafts 410. Stabilizing blocks 394 and 396 are mounted for sliding engagement with square bars 412, 414, 416 and 418. Because of the rigidity of the moving structure which includes stabilizing blocks 394 and 396, stub shafts 398 and 400, triangular mounting plates 402, 404, 406 and 408, and jaw pivot shafts 410, the sliding engagement of the stabilizing blocks with the square bars is primarily responsible for preventing Jaws 390 and 392 from rotating out of the plane of cam plate 386. These square bars are solidly mounted to the track 18 so as to help maintain the moving carousel drive jaws in the proper operating position. These square bars extend in a straight line for slightly more than the length of the carousel drive assembly 54. These square bars do not curve to follow the jaws around the respective ends of the cam plate 386 because at those portions of the jaws travel they are not under any significant load.

Jaws 390 and 392 are provided with sliding cam followers, typical examples of which appear at 420 and 422. Sliding cam followers 420 and 422 slide on the rounded cam surface 388 of cam plate 386 (FIGS. 30 and 31) as the chains 360 and 362 drive the jaws 390 and 392 along the endless loop defined by sprockets 356, 364, 358 and 366. The profile of rounded cam surface 388, in cooperation with the sliding cam followers 420 and 422, causes Jaws 390 and 392 to engage, clamp, and then release the studs 376. As, for example, sliding cam follower 420 at station 424 (FIG. 31) holds jaw 390 in fully clamped configuration, sliding cam follower 422, being on an expanding part of cam surface 388, is forcing jaw 392 into engagement with stud 376. At station 426 both sliding cam followers are on the same level of cam surface 388 and the jaws are fully clamped to stud 376. A sudden jar such as might occur in an earthquake will not cause stud 376 to move laterally away from the jaws. Only one or two sets of jaws need to be clamped on studs on opposite sides of the carousel at any one time to stabilize the entire carousel because it is not flexible enough to move laterally if it is held in a few locations. At station 428 sliding cam follower 420 has passed onto a reduced portion of cam surface 388, thus releasing stud 376. Sliding cam follower 422 is also moving onto a reduced portion of cam surface 388 so that it is no longer driving stud 376. This permits the pair of jaws at station 428 to accelerate as they begin their turn without attempting to drive stud 376 at a faster rate than it is being driven by the jaws at station 426. As illustrated particularly at station 424 where the drive chains have been broken away and the stabilizing blocks removed, jaw 392 is slotted so as to receive the tongue 430 of solid jaw 390 therewithin.

Figure 36:
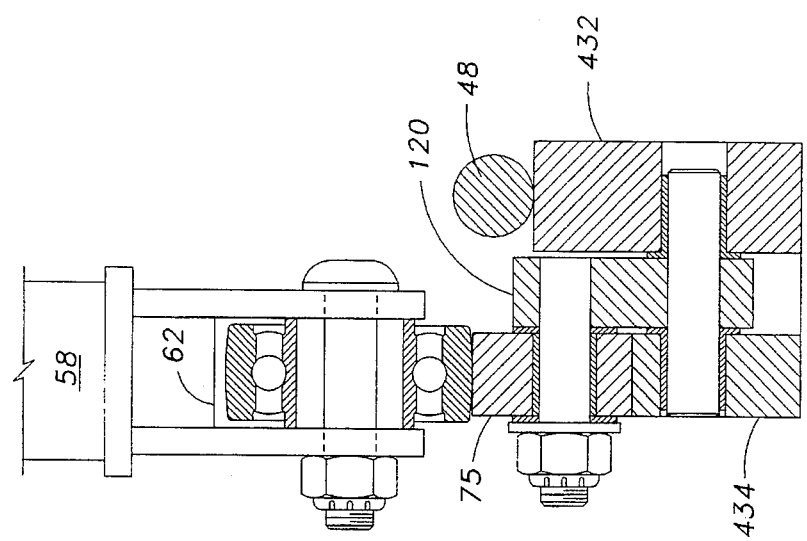
FIG. 36 is a cross-sectional view of typical structure by which the vertical drive members are moveably supported.
Figure 35:
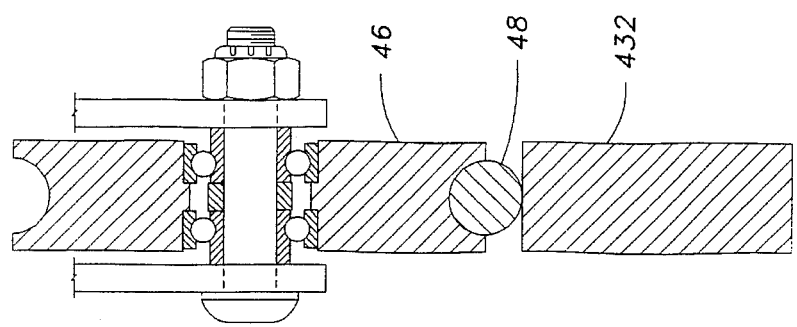
FIG. 35 is a cross-sectional view of typical structure by which the shuttle units are moveably supported.
Figure 38:
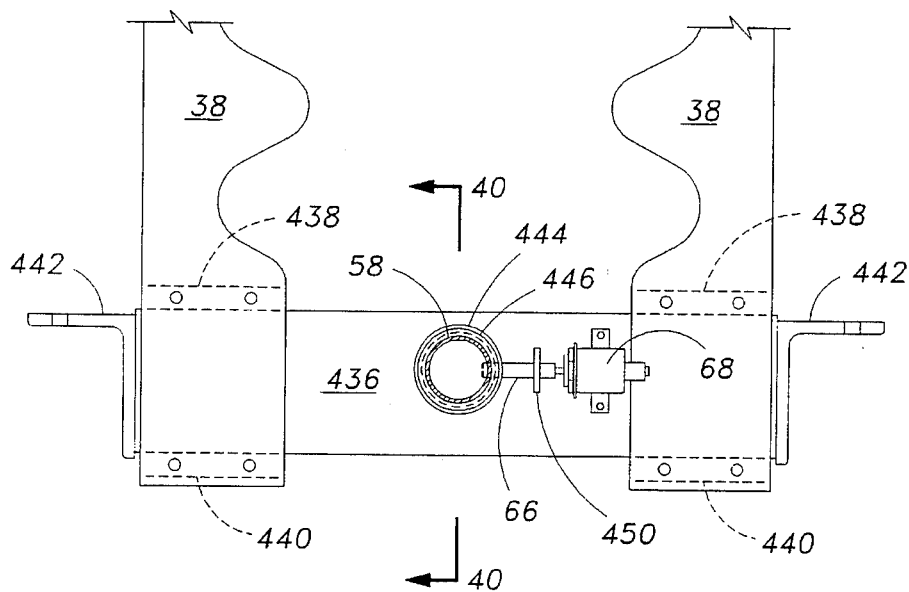
FIG. 38 is a partial plan view a shuttle fork assembly.
Figure 40:
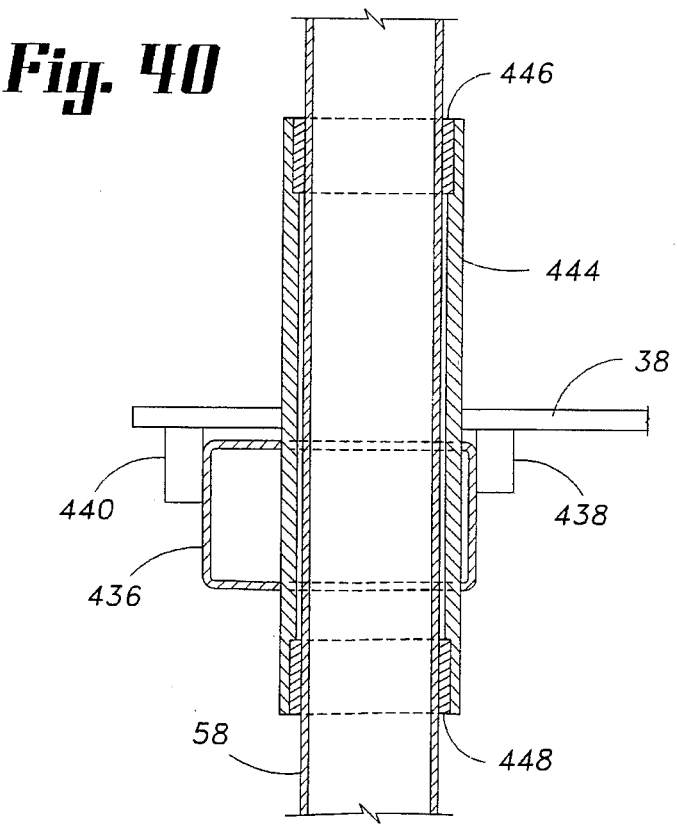
FIG. 40 is a cross-sectional view of the structure through which the shuttle fork assemblies are mounted to the vertical drive members.
Figure 39:
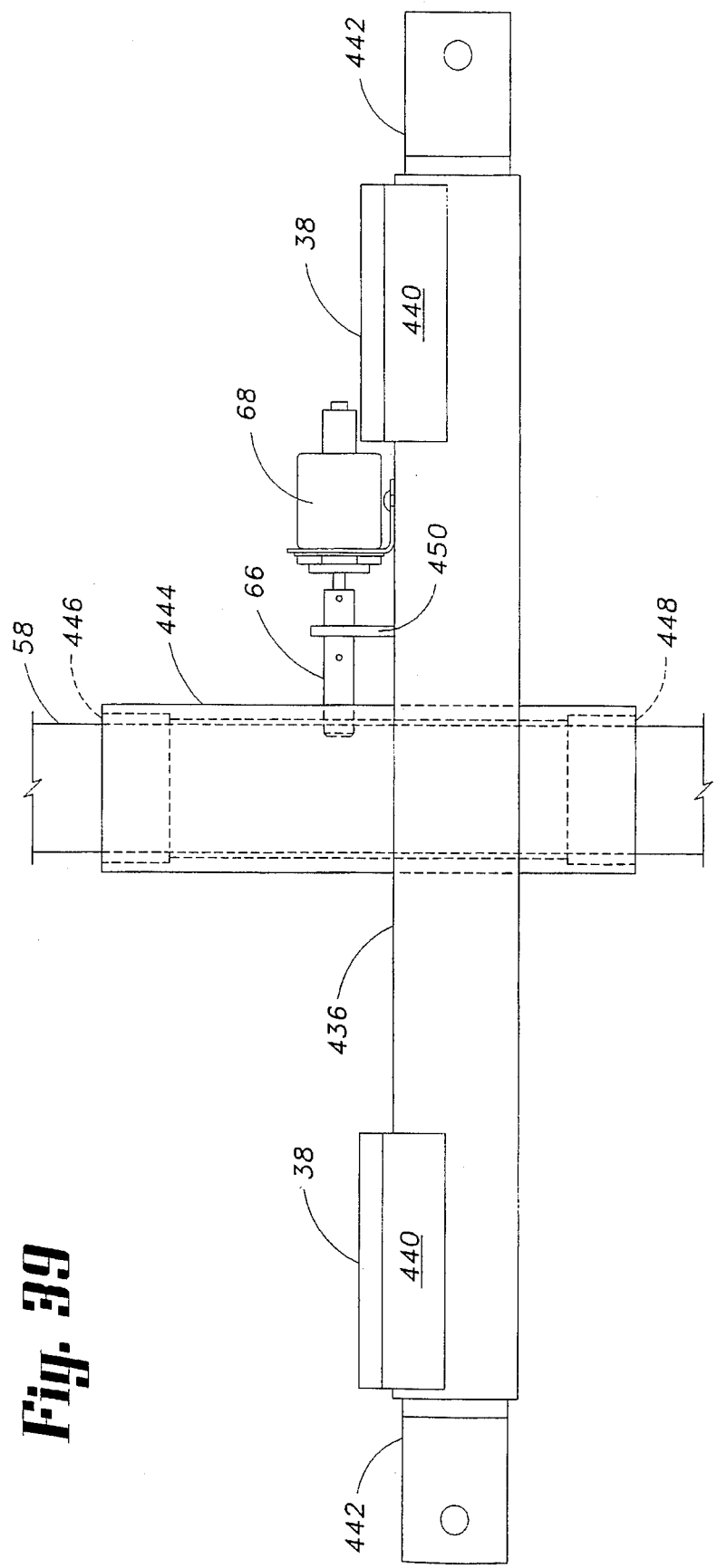
FIG. 39 is an elevational view of the shuttle fork assembly of FIG. 39.

The shuttle units 30 and 32 are mounted on grooved wheels 46 which engage with shuttle tracks 48. Shuttle tracks 48 are preferably in the form of round bars which are welded to the top edge of a solid shuttle base track member 432. See, for example, FIG. 35. The shuttle frames 41 and 43 carry the respective shuttle forks which are actuated by free running vertical drive members 60 and 58. The vertical drive members move with the respective shuttle frames but are carried by wheels 62 and 64 which roll over the surfaces of track bars 75 and 74, respectively. As previously described, the track bars are raised for one half of the shuttle units' cycle and lowered for the second half so as to drive those shuttle forks which are engaged with the drive members along paths 50 and 52. The details of a typical track bar and associated supporting structure, linkage and vertical drive member are illustrated, for example, in cross-section in FIG. 36. Attention is also invited to FIGS. 7, 8 and 12. Output track bar support member 434 journals one end of a pivot pin in a bearing and shuttle bar track member 432 journals the other end of that pin in a bearing. The track bar link 120 is fixed to the same pin between members 432 and 434. The other end of track bar link 120 is fixed to a pin which is journaled within a bearing in track bar 175. In FIG. 36 the track bar is illustrated at its lowest position.

Figure 37:
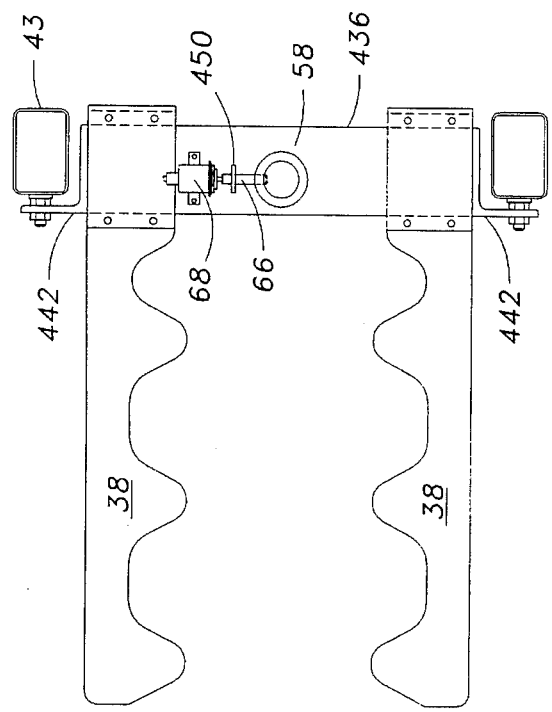
FIG. 37 is a plan view of a shuttle fork assembly.

A typical shuttle fork assembly is illustrated, for example, in FIG. 37. Attention is also invited to FIGS. 7, 8, 12, 38, 39 and 40. The shuttle fork assembly of FIG. 37 is illustrated as being mounted for limited vertical movement within frame 43 on a common vertical shaft with individual clutches at each shuttle fork assembly. The shuttle fork cross-member 436 of the shuttle fork assembly is mounted on vertical drive member 58 and the shuttle fork assembly is prevented from rotating in the plane of shuttle forks 38 by alignment brackets 442. The bolts indicated in the ends of alignment brackets 442 are for adjustment purposes and are preferably provided with low friction material where they slidably engage the face of frame 43. These bolts may be adjusted to take up any play. The shuttle forks 38 are mounted by, for example, screws, to cross-member 436 by means of inner and outer mounting brackets 438 and 440, respectively. Mounting brackets 438 and 440 are conveniently welded to cross-member 436. Vertical drive member 58 is mounted to the shuttle fork assembly through a mounting tube 444 which extends normally vertically through and it welded to cross-member 444. Vertical drive member 58 is received in a sliding fit within first and second bearings 446 and 448. When a particular shuttle fork assembly is to be actuated during a cycle of the shuttle unit which carries it, while the track bar is in its lowest position, a solenoid 68 is actuated to cause a pin 66 to pass through aligned openings in mounting tube 444 and vertical drive member 58, thus locking these structures together. The shuttle fork assembly thus moves upwardly with the vertical drive member when the track bar with which it is associated is raised to its elevated position. Solenoid actuator pin guide 450 serves to prevent the load, which the actuator pin encounters when it is engaged with the vertical drive member and the shuttle fork assembly is moved upwardly, from damaging the solenoid.

Figure 41:
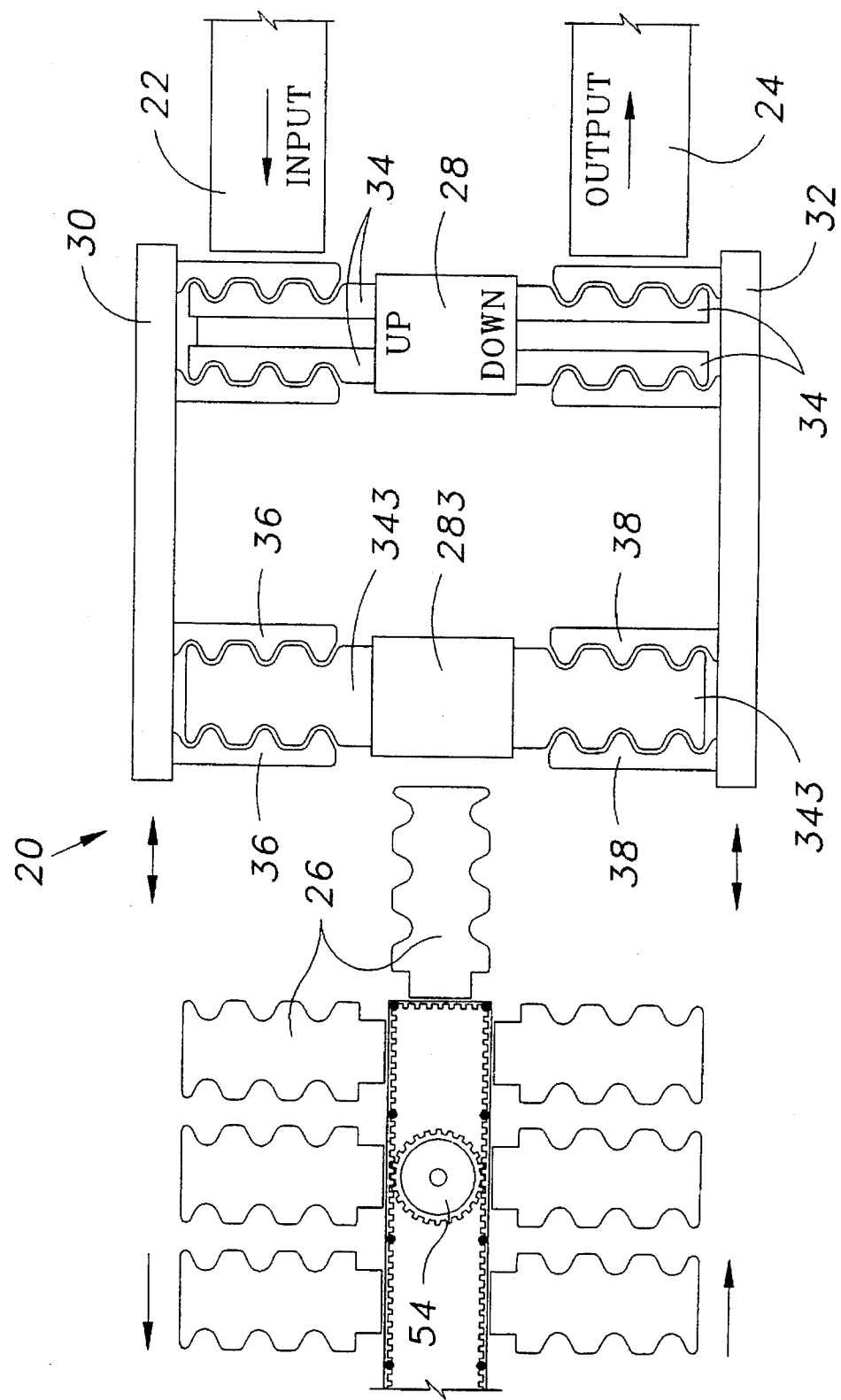
FIG. 41 is a diagrammatic plan view of an additional embodiment in which a holding station is provided.

With particular reference to FIG. 41, if desired, an intermediate holding station 283 may be provided between the vertical lift 28 and the storage carousel. In the holding station 283 the holding shelves 343 are fixed in place. A double set of shuttle forks 36 and 38 are provided. One set of shuttle forks 36, for example, carries containers from vertical lift 28 to holding station 283, and a second set carries containers from holding station 283 to carousel 12. All of the shuttle forks move as one unit just as in those embodiments where no holding station is present. Holding station 283 is normally not needed except in those situations where the storage carousel is being operated at or very near full capacity. Under such operating conditions speed and efficiency may be improved somewhat by the inclusion of a holding station.

What has been described are preferred embodiments in which modifications and changes and substitutions and reversals of parts may be made without departing from the spirit and scope of the accompanying claims.

What is claimed is:

1. A storage system for storing and handling individual containers comprising:

a storage carousel unit moveably mounted for substantially continuous generally horizontal movement along a generally endless path, said storage carousel unit including multiple racks and said racks including multiple tiers of carousel shelves;

a storage carousel drive assembly adapted to drive said storage carousel unit along said endless path;

a vertical lift unit spaced from said storage carousel unit, said vertical lift unit including a plurality of lift forks, said lift forks being mounted for generally vertical movement along ascending and descending reaches of said vertical lift unit, the lift forks momentarily adjacent the bottom of said vertical lift unit defining a lower level;

an input shuttle unit including a plurality of rows of input shuttle forks, said rows including a lower row, said input shuttle forks adapted to being driven between said storage carousel unit and said vertical lift unit in a generally horizontal direction in substantial synchronization with the movement of said storage carousel unit, the input shuttle forks being adapted to being driven individually and selectively in a generally vertical direction to engage and release containers, whereby the input shuttle unit is adapted to take pre-selected containers from said vertical lift unit and transfer them to said storage carousel unit;

an output shuttle unit including a plurality of ranks of output shuttle forks, said ranks including a lower rank, said output shuttle forks adapted to being driven between said storage carousel and said vertical lift unit in a generally horizontal direction in substantial synchronization with the movement of said storage carousel, the output shuttle forks being adapted to being driven individually and selectively in a generally vertical direction to engage and release containers, whereby the output shuttle unit is adapted to take pre-selected containers from the storage carousel unit and transfer them to said vertical lift unit, said lower level on said vertical lift unit being normally below the lower row and lower rank of said shuttle forks;

a conveyor section positioned adjacent said vertical lift unit and adapted to transfer containers to and from said lower level.

2. A storage system of claim 1 wherein the generally endless path along which the storage carousel unit moves includes an approaching-reach and a departing-reach, and said storage unit drive assembly comprises an endless chain member positioned between said approaching- and departing-reaches and a releasable rack engagement mechanism carried by said endless chain, whereby the engagement mechanism engages with, drives and then releases said racks as they pass by the drive assembly.

3. A storage system of claim 1 wherein the lift forks on the vertical lift unit are mounted for intermittent generally vertical movement along a substantially closed loop.

4. A storage system of claim 1 wherein said storage carousel drive assembly is mechanically interlinked with and drives said shuttle units.

5. A storage system of claim 1 wherein the input and output shuttle forks are shaped and positioned so as to intermesh with the lift forks and carousel shelves without interference.

6. A storage system of claim 1 wherein the path along which the storage carousel unit moves includes an approaching-reach and a departing-reach separated by first and second rack turning ends.

7. A storage system of claim 6 wherein said approaching- and departing-reaches extend generally parallel to one another separated by a distance approximately equal to the distance between the centers of said racks.

8. A storage system of claim 1 wherein the racks generally comprise rigid panels hinged together along their generally vertical edges to form a link belt, guide members generally adjacent the top and bottom edges of said link belt and adapted to prevent lateral movement of said link belt, said link belt being moveably supported on its generally lower edge.

9. A storage system of claim 8 wherein the link belt is driven by the storage carousel drive assembly at a location adjacent said lower edge.

10. A storage system of claim 1 including a shuttle drive assembly which is adapted to move said shuttle units through one full cycle from the storage carousel to the vertical lift unit and back to the storage carousel as the racks on the storage carousel unit move along said generally endless path for the length of approximately one rack, and a vertical lift drive assembly adapted to drive said vertical lift unit a generally vertical height equal to at least approximately two levels during each said full cycle.

11. A storage system of claim 10 wherein the shuttle drive assembly is mechanically interlinked with said storage carousel drive assembly, and the vertical lift drive assembly is independent of the shuttle drive assembly and the storage carousel drive assembly.

12. A storage system of claim 1 wherein said racks have widths which are substantially equal to one another, and including a shuttle drive assembly which is adapted to move said shuttle units through one full cycle from the storage carousel to the vertical lift unit and back to the storage carousel as the racks on the storage carousel unit move along said generally endless path for approximately the width of one rack.

13. A storage system of claim 1 wherein each tier of carousel shelves has a corresponding row of shuttle input forks and rank of shuttle output forks operatively positioned adjacent thereto; whereby a first container may be extracted from, and a second container inserted on, each tier of said storage carousel unit during one full cycle.

14. A storage system of claim 1 wherein each said shuttle unit includes a free running drive member operatively associated with said shuttle forks and independently engageable latching elements operatively interconnecting said free running drive member and individual ones of said shuttle forks.

15. A storage system of claim 14 wherein the vertically mounted free running drive members are adapted to move with said shuttle units and are adapted to being actuated for vertical movement during each cycle of said shuttle units.

16. A storage system for storing and handling individual containers comprising:

support means arranged in a plurality of tiers on a plurality of racks on a substantially continuously moving storage carousel unit for removably supporting individual storage containers, each said rack generally including a plurality of tiers of said support means, each said rack having a width;

carousel drive means for substantially continuously moving said storage carousel unit along an endless path;

a vertical transfer unit spaced from said storage carousel unit;

conveyor means for receiving storage containers from and delivering storage containers to said transfer unit;

shuttle means for transferring selected storage containers generally horizontally between said storage carousel unit and the vertical transfer unit, said shuttle means including output means for selectively engaging and removing storage containers from said support means and delivering them to said transfer unit, and input means for selectively engaging and removing storage containers from said transfer unit and delivering them to said support means; and actuator means for substantially continuously moving said output and input means between the transfer unit and the storage carousel in synchronization with said carousel drive means and selectively actuating said output and input means to selectively engage and transfer individual storage containers between said transfer unit and said storage carousel unit, said transfer unit including moveable shelf means for supporting the storage containers and carrying them generally vertically between the shuttle means and the conveyor means, said actuator means moving said output and input means through a complete cycle from said storage carousel unit to said transfer unit and back to said storage carousel unit while said drive means is moving said storage carousel unit along said generally endless path for a distance approximately equal to the width of one said rack.

17. A storage system of claim 16 wherein there is generally at least one output means and one input means for each tier of support means.

18. A storage system for storing and handling individual containers comprising:

support means arranged in a plurality of rows and columns for removably supporting individual storage containers, each of said columns having a width;

drive means for substantially continuously moving said support means along a generally endless path to and from a handling location;

a transfer unit spaced from said handling location, said transfer unit including a plurality of moveable shelf means for moveably supporting said storage containers on ascending and descending reaches of said transfer unit;

conveyor means for receiving storage containers from and delivering storage containers to said shelf means;

shuttle means for selectively engaging and transferring pre-selected storage containers between the support means and the shelf means, there generally being one level of shuttle means for each said row of support means, said shuttle means including input means for inserting storage containers onto said support means and output means for extracting containers from said support means;

actuator means for moving said shuttle means between the transfer unit and the handling location in synchronization with said drive means and for selectively engaging said shuttle means with individual storage containers, said actuator means adapted to move said shuttle means through a complete cycle from said handling location to said transfer unit and back to said handling location while said drive means is moving said support means along said endless path for a distance approximately equal to the width of one said column, whereby a plurality of storage containers from each said row at said handling location may be transferred between the handling location and the transfer unit during one complete cycle.

19. A storage system of claim 18 wherein said support means are mounted on a plurality of rack members, said rack members comprising generally rigid panels hinged together for articulation along generally vertical axes to form an endless link belt member, guide means for preventing said link belt member from moving laterally, and track means for supporting said link belt member for movement along said generally endless path.

20. A storage system of claim 19 wherein said drive means is mounted at a drive location adjacent said endless path and includes releasable latching means for positively engaging, driving and then releasing individual ones of said rack members as they move past said drive location, at least one of said rack members being positively engaged by said latching means at all times.

21. A storage system of claim 18 including shelf drive means for driving said shelf means intermittently in a generally vertical direction, said support means being driven substantially continuously in a generally horizontal direction and said shelf drive means being capable of driving said shelf means at such a rate that they travel a vertical distance approximately equal to at least the distance between two said rows of support means during one said complete cycle.

22. A storage system of claim 21 including means for transferring a plurality of containers between one level of said shelf means and said conveyor means during one said complete cycle.

23. A storage system of claim 18 including at least one shelf means for each said row of support means, whereby all of the storage containers on the support means in a first said column may be transferred to said transfer unit and all of the support means in a second said column may be filled with storage containers from said transfer unit during one complete cycle.

24. A storage system of claim 18 wherein there is at least one more level of shelf means than there are levels of shuttle means, said conveyor means being positioned to exchange storage containers with said transfer means at a level of shelf means where there is no corresponding level of shuttle means.

25. A storage system comprising a transfer unit with a plurality of generally vertically moveable shelf members, a conveyor unit positioned operatively adjacent said transfer unit, a storage carousel unit, and a shuttle unit operatively positioned between the transfer unit and the storage carousel unit and adapted to transfer storage containers between said transfer unit and said storage carousel unit, said carousel unit including a plurality of individual storage containers removably arranged in a plurality of rows and columns on said carousel unit, said shuttle unit including a level of storage container engagement members for approximately each of said rows, said storage container engagement members being reversibly displaceable in (1) a longitudinal direction between said storage carousel unit and said vertically moveable shelf members and (2) a vertical direction for contacting and lifting at least one of said storage containers from one of said vertically moveable shelf members;

a carousel drive assembly mounted in a fixed location adjacent said storage carousel unit and adapted to releasably lock to and drive at least one of said racks at a time for a short distance at a substantially constant rate along a closed endless path; and, a shuttle drive mechanism adapted to drive the shuttle unit between the storage carousel unit and the transfer unit.

26. A storage system of claim 25 wherein said carousel drive assembly is mechanically interlinked with and drives said shuttle unit.

27. A storage system of claim 25 wherein said carousel drive assembly includes cam actuated jaw members positioned to engage and lock to studs carried by said racks.

28. A storage system of claim 25 wherein said storage carousel unit is mounted for generally horizontal movement along an endless loop with generally parallel approaching and departing reaches, said carousel drive assembly being mounted between said reaches and adapted to engage substantially simultaneously with racks on each of said reaches.

29. A storage system of claim 25 wherein said carousel drive assembly includes cam actuated jaw members positioned to engage and lock to studs carried by said racks, said jaw members being mounted to an endless loop of chain for movement over said cam.

30. A storage system comprising a transfer unit with a plurality of generally vertically moveable shelf members, a conveyor unit positioned operatively adjacent said transfer unit, a storage carousel unit, and a shuttle unit operatively positioned between said transfer unit and the storage carousel unit and adapted to carry storage containers between said transfer unit and said storage carousel unit, said storage carousel unit including a drive assembly adapted to drive the storage carousel unit at a substantially constant rate along a closed endless path, a drive mechanism operatively associated with the shuttle unit and adapted to drive said shuttle unit along a generally reciprocal path between the transfer unit and the storage carousel unit, said drive assembly and said drive mechanism being coordinated with one another, said carousel unit including a plurality of individual storage containers removably arranged in a plurality of rows and columns on said carousel unit, each of said rows generally occupying a level, said shuttle unit including a level of storage container engagement members for approximately each of said rows, said transfer unit extending generally vertically to an empty level beyond the levels of said rows, said conveyor unit being positioned to inject and extract containers from said transfer unit at said empty level.

* * * * *